US010855782B2

(12) United States Patent
MacTiernan et al.

(10) Patent No.: US 10,855,782 B2
(45) Date of Patent: Dec. 1, 2020

(54) ATTRIBUTING USERS TO AUDIENCE SEGMENTS

(71) Applicant: iHeartMedia Management Services, Inc., San Antonio, TX (US)

(72) Inventors: Daniel N. MacTiernan, Somers Point, NJ (US); Jeffrey Lee Littlejohn, Cincinnati, OH (US); David C. Jellison, Jr., Ogallala, NE (US); Jeffrey James Bengel, Springboro, OH (US); Todd Louis Goldberg, Chicago, IL (US)

(73) Assignee: iHEARTMEDIA MANAGEMENT SERVICES, INC., San Antonio, TX (US)

( * ) Notice: Subject to any disclaimer, the term of this patent is extended or adjusted under 35 U.S.C. 154(b) by 974 days.

(21) Appl. No.: 14/505,164

(22) Filed: Oct. 2, 2014

(65) Prior Publication Data

US 2015/0026308 A1    Jan. 22, 2015

Related U.S. Application Data

(63) Continuation-in-part of application No. 14/264,274, filed on Apr. 29, 2014, which is a continuation-in-part
(Continued)

(51) Int. Cl.
*G06Q 30/02* (2012.01)
*H04L 29/08* (2006.01)
(Continued)

(52) U.S. Cl.
CPC .............. *H04L 67/22* (2013.01); *G06Q 30/02* (2013.01); *G06Q 30/0272* (2013.01);
(Continued)

(58) Field of Classification Search
CPC ..................................................... G06Q 30/02
See application file for complete search history.

(56) References Cited

U.S. PATENT DOCUMENTS 5,778,187 A    7/1998 Monteiro et al.
5,822,735 A    10/1998 De Lapa et al.
(Continued)

OTHER PUBLICATIONS

Shermach, Kelly; Electronic Coupon Program Offers Data-Base Potential; Sep. 25, 1995; Marketing News; 3 pgs.

*Primary Examiner* — Thuy N Nguyen
(74) *Attorney, Agent, or Firm* — Garlick & Markison; Edward J. Marshall

(57) ABSTRACT

A streaming media server inserts contextual markers into a media stream being delivered to an end user device for play out to an end user. The contextual markers can be inserted in-band into spot blocks, and can be used to identify media items included in the spot block. When the contextual markers trigger the end-user device to send a message identifying the media content, e.g. a particular show, included in the spot block to a data management platform (DMP). The DMP uses the messages triggered by the contextual markers to attribute the end user to the media content. If a threshold number of attributions is received, and if the attributions are sufficiently recent, the end user can be a associated with an audience segment. The attribution and association information can be delivered to an ad server, which uses that information to select targeted advertisements to air during the show.

20 Claims, 15 Drawing Sheets

Related U.S. Application Data of application No. 14/076,420, filed on Nov. 11, 2013, now Pat. No. 10,346,884, which is a continuation-in-part of application No. 13/021,882, filed on Feb. 7, 2011, now Pat. No. 8,600,813, which is a continuation-in-part of application No. 09/854,319, filed on May 11, 2001, now Pat. No. 7,890,368.

(51) Int. Cl.
| | |
|---|---|
| *H04N 21/442* | (2011.01) |
| *H04N 21/858* | (2011.01) |
| *H04N 21/258* | (2011.01) |
| *H04N 21/845* | (2011.01) |
| *H04N 21/658* | (2011.01) |
| *H04N 21/81* | (2011.01) |
| *H04N 21/234* | (2011.01) |

(52) U.S. Cl.
CPC ... *G06Q 30/0277* (2013.01); *H04N 21/23424* (2013.01); *H04N 21/25891* (2013.01); *H04N 21/44218* (2013.01); *H04N 21/6582* (2013.01); *H04N 21/812* (2013.01); *H04N 21/8456* (2013.01); *H04N 21/858* (2013.01)

(56) References Cited

U.S. PATENT DOCUMENTS

| | | | |
|---|---|---|---|
| 5,983,005 A | 11/1999 | Monteiro et al. | |
| 6,035,280 A | 3/2000 | Christensen | |
| 6,119,163 A | 9/2000 | Monteiro et al. | |
| 6,185,541 B1 | 2/2001 | Scroggie et al. | |
| 6,324,519 B1 | 11/2001 | Eldering | |
| 6,757,662 B1 | 6/2004 | Greenwald et al. | |
| 6,885,994 B1 | 4/2005 | Scroggie et al. | |
| 9,652,783 B2 * | 5/2017 | Roberts | G06Q 30/0269 |
| 2009/0307732 A1 * | 12/2009 | Cohen | G06Q 30/02 725/87 |
| 2012/0059707 A1 * | 3/2012 | Goenka | G06Q 30/0242 705/14.41 |
| 2012/0179543 A1 * | 7/2012 | Luo | G06Q 30/0256 705/14.54 |
| 2013/0073546 A1 * | 3/2013 | Yan | G06F 17/30867 707/732 |
| 2015/0012350 A1 * | 1/2015 | Li | G06Q 30/0243 705/14.42 |
| 2015/0220941 A1 * | 8/2015 | Tamir | G06Q 30/0201 705/7.29 |
| 2015/0245084 A1 * | 8/2015 | Downing | H04N 21/2668 725/12 |

\* cited by examiner

| | Split Minute Ordering Options | Listen Experience | Category Conflict | Constraints Inventory/ Pacing Mgmt | Rev. Mgmt, Ad Ops POV | NPP POV |
|---|---|---|---|---|---|---|
| 1 | Internal Third Party | Ads>Fill>Ads>Fill | YES | MINIMAL | National buyers at end | Fill and paid ads mixed together |
| 2 | Third Party Internal | Ads>Fill>Ads>Fill | YES | MINIMAL | Local buyers at end | Fill and paid ads mixed together |
| 3 | Internal & Third Party Alternate Positions | Ads>Fill>Ads>Fill | YES | MINIMAL | Alternating buyers at end | Fill and paid ads mixed together |
| 4 | Internal & Third Party Alternate Breaks | Ads, Fill | NO | HIGH- constrains inventory | Constrains Inventory | May lose long form fill due to split |
| 5 | Internal/sellable Third Party/sellable Internal/Fill | Ads>Ads>Fill more likely, though still have Ads>Fill>Ads>Fill | YES | MINIMAL | National buyers at end; more clocks to manage | Dedicated run for long form fill |
| 6 | Third Party/sellable Internal/sellable Third Party/Fill | Ads>Fill | YES | MINIMAL | Revenue and Inventory management - possible additional complexity | Ads do not mix with fill |

FIG. 11

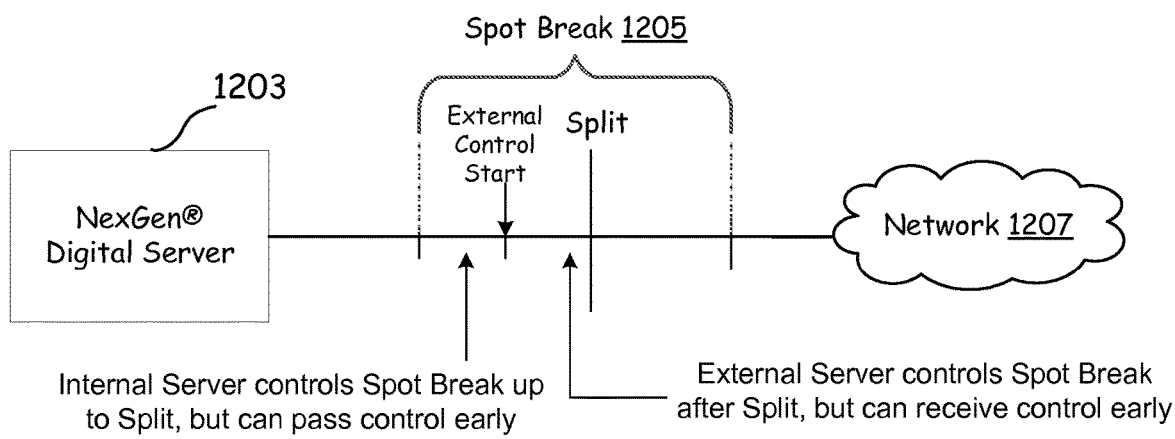

FIG. 12

ATTRIBUTING USERS TO AUDIENCE SEGMENTS

CROSS REFERENCE TO RELATED APPLICATIONS

The present U.S. Utility Patent Applications is a continuation-in-part of U.S. Utility application Ser. No. 14/264,274, entitled "Media Delivery to Limited Capability Platforms", filed Apr. 29, 2014, which is a continuation-in-part of U.S. Utility application Ser. No. 14/076,420, entitled "Split Spot Breaks", filed Nov. 11, 2013, which is a continuation-in-part of U.S. Utility application Ser. No. 13/021,882, entitled "Technique of Providing Targeted Media Items", filed Feb. 7, 2011, issued as U.S. Pat. No. 8,600,813 on Dec. 3, 2013, which is a continuation-in-part of U.S. Utility application Ser. No. 09/854,319, entitled "Providing Targeted Media Advertising Inventory", filed May 11, 2001, issued as U.S. Pat. No. 7,890,368 on Feb. 15, 2011, all of which are hereby incorporated herein by reference in their entirety and made part of the present U.S. Utility Patent Applications for all purposes.

FIELD

This invention relates in general to computer implemented systems, and more particularly, to splitting spot breaks.

BACKGROUND

The Internet is a vast collection of global-spanning networks that communicate with each other by using protocols, such as the Transmission Control Protocol (TCP) and the Internet Protocol (IP). Via its networks, the Internet enables many computers, located at different sites around the world, to access information from each other.

The World Wide Web (i.e., the "WWW" or the "Web") is the fastest growing part of the Internet. The Web works within a client/server model. Web client software runs on the Web client computers, and Web server software runs on the Web server computer. Web client software—known as the Web browser—interacts with both the user and the Web server software. In particular, the Web browser receives a Universal Resource Locator (URL) request from a user. The URL is a unique identifier for requested information. The Web browser then sends the URL request to the Web server software using Hypertext Transfer Protocol (HTTP). In response to the URL request, the Web server software locates and returns the requested information to the Web browser.

The Web contains Web pages that incorporate text, graphics, sound, animation, and other multimedia elements. Many Web pages are formatted in a language called Hypertext Markup Language (HTML). HTML controls the appearance of a Web page. Specifically, HTML controls how information, such as, text, images, and push-buttons are arranged on a Web page. Hypertext links connect the web pages to each other, and to any other pages, graphics, binary files, or multimedia files.

HTML is based on SGML (Standard Generalized Markup Language). SGML allows documents to describe their own grammar—that is, to specify a tag set used in the document, and to specify the structural relationships that those tags represent. SGML makes it possible to define different formats, for your each document; to handle large and complex documents; and to manage large information repositories. Full SGML, however, contains many optional features that are not needed for Web applications.

HTML web pages incorporate a small set of tags in conformance with SGML. In general, HTML is well suited for hypertext, multimedia, and the display of small and reasonably simple documents. HTML is not well suited for large, complex documents.

The World Wide Web Consortium (W3C) created a simplified subset of SGML, specially designed for Web applications, and designed for large and complex documents. This subset is called XML (Extensible Markup Language). XML is independent of any platform, vendor, or application. Therefore, XML can be used to exchange information, without regard to the system that the information is coming from or going to. In addition, XML enables the exchange of information, not only between different computer systems, but it also enables the exchange of information across different languages.

The Web has provided authors, scientist, academics, and other content providers with a vehicle for distributing their works across a global network. Web users, however, seem to view the Web as analogous to basic cable. For cable, people pay a basic rate for the cable connection, and rarely do they pay additional fees for a particular cable show. Similarly, Web users are willing to pay a basic rate for an Internet connection, but they are less willing to pay additional fees for content. Consequently, advertising is one way that the content provider can generate revenue.

Many content providers seek to increase their advertising revenue by targeting advertisements to users, based on variables such as gender, age, geographic location, etc. In general, content providers can justify high advertising rates by showing that a company's advertisements are being viewed by users that would likely purchase the company's product.

Currently, targeted advertising uses affirmative actions taken by a user to determine whether that user is part of the target audience. Examples of the actions used in making this determination include page views, page events, feedback from social media sites, pressing a skip button, launching a streaming media station, or the like. However, the currently available attribution techniques make it difficult or impossible to capture passive activity not associated with a specific user action or feedback, and use that passive activity in generating targeted advertising.

In view of the above it should be apparent that conventional techniques for tracking and attributing behavior and intent, ad delivery techniques, devices, and systems are less than perfect.

SUMMARY

To overcome the limitations in the prior art described above, and to overcome other limitations that will become apparent upon reading and understanding the present specification, various methods, apparatuses, and articles of manufacture for providing targeted information to consumers are disclosed.

In some embodiments, a streaming media server can be used to insert contextual markers into spot blocks. Note that as used in various embodiments herein, the term "spotblocks" refers not only to blocks of advertisements, but also to blocks of other media content such as one or more shows or songs. When an end-user device encounters the contextual marker, a message to a data management platform (DMP) can be triggered. The message can include a media identifier, for example identifying the media content in the spot block as a particular show. The DMP can use the information in the message to attribute, or associate, the end-user with the media content. After a threshold number of attributions, the user can be attributed to, or associated with, a particular audience segment.

The attribution or association information can be delivered to an ad server that uses the information to more accurately target advertisements to the end user and more accurately target advertisements associated with the media content. Additionally, the techniques discussed herein can be used to more accurately determine the size of a show's audience, because the techniques take into account passive audience behavior instead of relying on actions affirmatively taken by audience members.

BRIEF DESCRIPTION OF THE DRAWINGS

Aspects of this disclosure will become apparent upon reading the following detailed description and upon reference to the accompanying drawings, in which like references may indicate similar elements:

FIG. 11 is a table illustrating various considerations relating to split spot break ordering options according to various embodiments of the present disclosure;

FIG. 12 is a diagram illustrating a spot break split according to various embodiments of the present disclosure;

DETAILED DESCRIPTION

Figure 1:
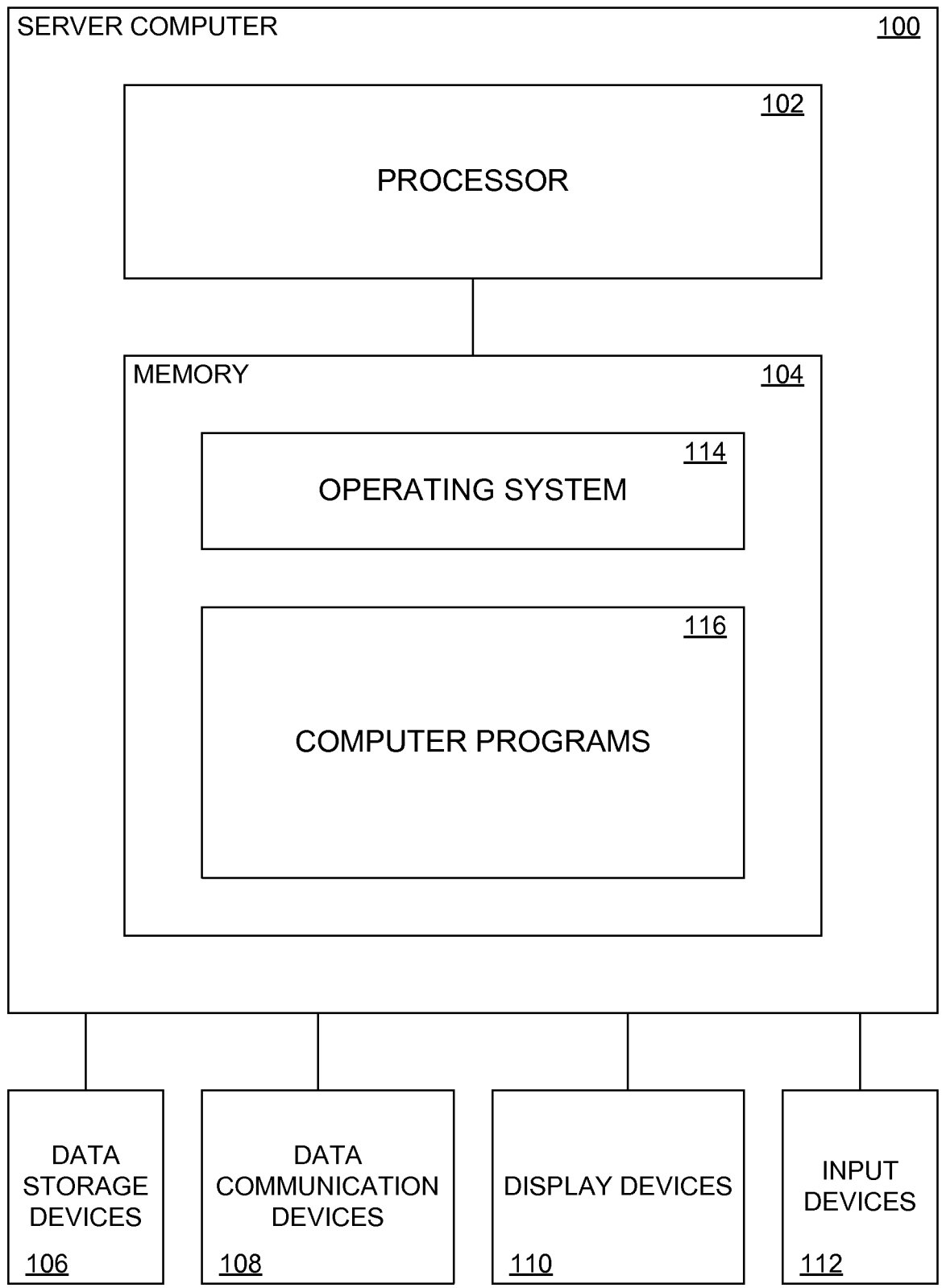
FIG. 1 is a schematic diagram illustrating a hardware environment used to implement a server computer in one embodiment of the invention.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

One embodiment of this invention is comprised of a collection of components, which will be referred to herein as the "Third Party Advertising System" or "TPAS." It is to be understood that these components may be combined in many different ways to form a variety of combinations within the scope of the invention. The term TPAS is sometimes used herein interchangeably with the term "ad server," although not all ad servers belong to third parties. Furthermore, ad servers may or may not include all of the functionality of TPAS servers described herein.

The TPAS enables a user or ad proxy to access a list of targeted advertisement options (also referred to as data items). Initially, an ad proxy or a user at a client computer, invokes the TPAS. The TPAS then requests logon authorization information from the user. The logon authorization information includes a client identifier (e.g., username and/or password), a client interface version, and the Greenwich Mean Time (GMT). The logon authorization information can also include local time, including, but not limited to Pacific, Mountain, Central, and Eastern Time. Alternatively, the logon authorization information can be unencrypted.

To determine whether a user, an ad proxy, or both are authorized to access the TPAS system, the TPAS system compares the client identification information with logon information contained in a database that is connected to the TPAS server computer. When a match exists, the TPAS returns a limited life span key to the user. This limited life span key provides the user with the ability to encrypt data and decipher encrypted data. The limited life span key is active for a pre-defined time duration (e.g., ten minutes). Alternatively, the TPAS system may place a cookie on the user computer to enable requests for targeted advertisements without requiring logon information, thereby allowing the user to remain anonymous.

The ad proxy or user uses the limited life span key to encrypt a request for targeted advertisement options. The request contains parameter requirements, including audience demographic requirements and/or content requirements. The ad proxy or user sends the encrypted request to the TPAS.

In response to the encrypted request, the TPAS compares the parameter requirements with the description of each advertisement stored in the database. The TPAS then uses XML to create a list which contains each advertisement that satisfies the parameter requirements. Advertisements that satisfy the parameter requirements are referred to as targeted advertisements. Of course, a different mark-up language could be used for the list, such as HTML or SGML, without exceeding the scope of this invention.

Next, the TPAS encrypts the XML list, and returns the encrypted list to the client computer. The client computer uses its limited life span key to decrypt the XML list of targeted advertisements.

At this point, the user or ad proxy may select one or more targeted advertisements from the list. The user can then purchase the selected, targeted advertisements from any advertisement provider. When the purchased advertisements are played and/or displayed, the client computer sends a XML report to the TPAS. Of course, a different mark-up language could be used for the report, such as HTML or SGML, without exceeding the scope of this invention. This report is an example of a type of tracking-call, although tracking-calls are not limited to only these types of reports.

One advantageous feature of the TPAS includes providing users or ad proxies with a list of targeted advertisements, wherein, each of the targeted advertisements satisfies the user's parameter requirements. In addition, since XML can be used to exchange information, without regard to the system that the information is coming from or going to, the TPAS can be used with any device or appliance that can transmit and receive a XML communication.

Another embodiment of this invention can include a collection of components, referred to herein as a "Third Party Media Distribution System" or "TPMDS." In some embodiments, the TPMDS includes or is used to implement an external ad management system. TPMDS components may be combined in many different ways to form a variety of combinations within the scope of the invention.

The TPMDS can handle the distribution of lists of multiple types of media, including, but not limited to advertisements, music videos, radio programs. Types of advertisements that can be handled and differentiated by the TPMDS can include, but are not limited to, promotional advertisements, gateway advertisements, banner advertisements, commercial advertisements, and "jingles." In addition, the TPMDS can accept, differentiate and convert between media of different audio formats, including, but not limited to WAV, WMP, WMA, Real, QT, MP3, MP4, Liquid, and Emblaze formats; the TPMDS can also accept, differentiate and convert media of different file wrapper formats, including, but not limited to RSS and MP4 formats; the TPMDS can also accept, differentiate and convert between various streaming protocols, including but not limited to RTSP, RTMP, MMS, RTP, UDP, TCP, HDS, and HLS. For example, the TPMDS enables a user to access a list of targeted media item options (also referred to as data items), and compares parameter requirements with media item information stored in a database. The TPMDS can also handle the distribution of media items using servers other than the server within which the TPMDS is located, including servers transmitting dynamic media streams, as the database can retrieve information on media items to be retrieved using other servers. Finally, the TPMDS can receive and transmit information with client devices other than computers, such as consumer devices, which can include appliances, personal digital assistants (PDAs), wrist watches, stand-alone Internet radios, set top boxes, and television systems. The TPMDS enables a user to access a list of targeted advertisement options (also referred to as data items).

Initially, the user at a client computer, or the ad proxy, invokes the TPMDS. The TPMDS then requests logon authorization information from the user. The logon authorization information includes a client identifier (e.g., user-name and/or password), a client interface version, and the Greenwich Mean Time (GMT). The logon authorization information can also include local time, including, but not limited to Pacific, Mountain, Central, and Eastern Time. Alternatively, the logon authorization information can be unencrypted.

To determine whether a user is an authorized user, the TPMDS system compares the client identification information with logon information contained in a database that is connected to the TPMDS server computer. When a match exists, the TPMDS returns a limited life span key to the user. This limited life span key provides the user with the ability to encrypt data and decipher encrypted data. The limited life span key is active for a pre-defined time duration (e.g., ten minutes). Alternatively, the TPMDS system may place a cookie on the user computer to enable requests for targeted media items without requiring logon information, thereby allowing the user to remain anonymous.

The user or ad proxy uses the limited life span key to encrypt a request for targeted media item options. The request contains parameter requirements, including audience demographic requirements and/or content requirements. The request can also contain media requirements, including, but not limited to specific media type, including, but not limited to specific audio format and file wrapper format. For example, a user may request targeted commercial spots that are of a specific file wrapper format and audio format. The user sends the encrypted request to the TPMDS.

In response to the encrypted request, the TPMDS compares the parameter requirements with the description of each media item stored in the database. The TPMDS then uses XML to create a list which contains each media item that satisfies the parameter requirements. Media items that satisfy the parameter requirements are referred to as targeted media items. Of course, a different mark-up language could be used for the list, such as HTML or SGML, without exceeding the scope of this invention.

Next, the TPMDS encrypts the XML list, and returns the encrypted list to the client computer. The client computer, or ad proxy, uses its limited life span key to decrypt the XML list of targeted media items.

At this point, the user may select one or more targeted media items from the list. The user can then purchase the selected, targeted media items from any media item provider. When the purchased media items are played and/or displayed, the client computer sends a XML report to the TPMDS. Of course, a different mark-up language could be used for the report, such as HTML or SGML, without exceeding the scope of this invention.

Before providing the details of the TPAS and the TPMDS, the hardware environments used to implement a client computer, client device, and a server computer in one embodiment of the present invention are discussed.

FIG. 1 is a schematic diagram illustrating a hardware environment used to implement a server computer 100 in one embodiment of the invention. The present invention is typically implemented using a server computer 100, which generally includes a processor 102, a random access memory (RAM) 104, data storage devices 106 (e.g., hard, floppy, and/or CD-ROM disk, drives, etc.) data communications devices 108 (e.g., modems, network interfaces, etc.), display devices 110 (e.g., CRT, LCD display, etc.), and input devices 112 (e.g., mouse pointing device, keyboard, CD-ROM drive, etc.). It is envisioned that attached to the server computer 100 may be other devices, such as read only memory (ROM), a video card, bus interface, printers, etc. Those skilled in the art will recognize that any combination of the above components, or any number of different components, peripherals, and other devices, may be used with the server computer 100.

The server computer 100 operates under the control of an operating system (OS) 114. The operating system 114 is booted into the memory 104 of the server computer 100 for execution when the server computer 100 is powered-on or reset. In turn, the operating system 114 then controls the execution of one or more computer programs 116, such as the comparison software for comparing the parameter requirements with available advertisements, and list software for creating a XML list of targeted advertisements. The present invention is generally implemented in these computer programs 116, which execute under the control of the operating system 114, and cause the server computer 100 to perform the desired functions as described herein.

The operating system 114 and computer programs 116 are comprised of instructions which, when read and executed by the server computer 100, cause the server computer 100 to perform the steps necessary to implement and/or use the present invention. Generally, the operating system 114 and/or computer programs 116 are tangibly embodied in and/or readable from a device, carrier, or media such as memory 104, data storage devices 106, and/or data communications devices 108. Under control of the operating system 114, the computer programs 116 may be loaded from the memory 104, data storage devices 106, and/or data communications devices 208 into the memory 204 of the server computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein, is intended to encompass a tangible, non-transitory, computer storage medium that stores a computer program accessible from any computer-readable device, carrier, or media. Of course, those skilled in the art will recognize many modifications may be made to this configuration without departing from the scope of the present invention.

Those skilled in the art will also recognize that the environment illustrated in FIG. 1 is not intended to limit the present invention. Indeed, those skilled in the art will recognize that other alternative hardware environments may be used without departing from the scope of the present invention.

Figure 2:
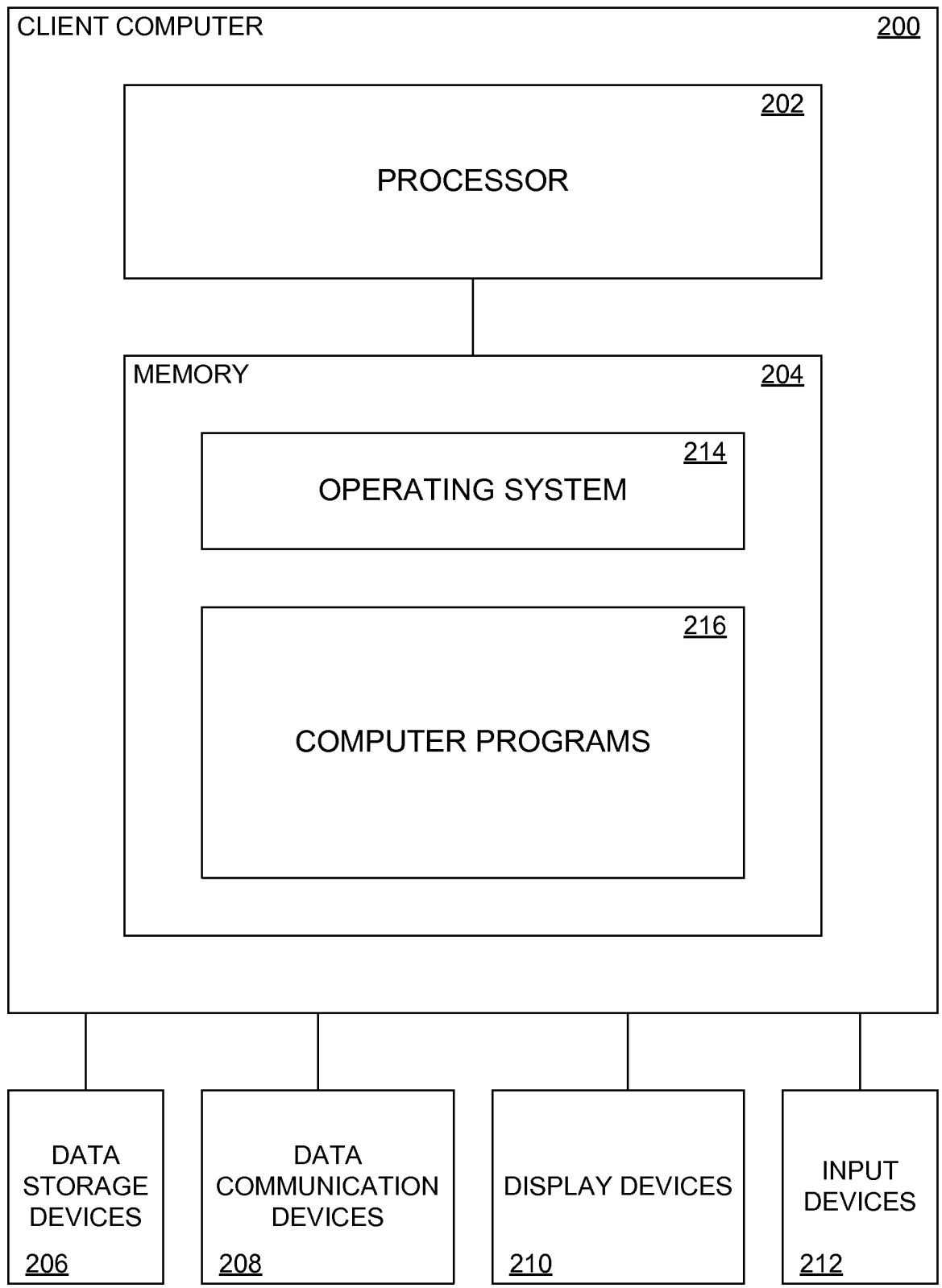
FIG. 2 is a schematic diagram illustrating a hardware environment used to implement a client computer in one embodiment of the invention.

FIG. 2 is a schematic diagram illustrating a hardware environment used to implement a client computer 200 in one embodiment of the invention. The present invention is typically implemented using a client computer 200, which generally includes a processor 202, a random access memory (RAM) 204, data storage devices 206 (e.g., hard, floppy, and/or CD-ROM disk, drives, etc.), data communications devices 208 (e.g., modems, network interfaces, etc.), display devices 210 (e.g., CRT, LCD display, etc.), and input devices 212 (e.g., mouse pointing device, keyboard, CD-ROM drive, etc.). It is envisioned that attached to the client computer 200 may be other devices, such as read only memory (ROM), a video card, bus interface, printers, etc. Those skilled in the art will recognize that any combination of the above components, or any number of different components, peripherals, and other devices, may be used with the client computer 200.

The client computer 200 operates under the control of an operating system (OS) 214. The operating system 214 is booted into the memory 204 of the client computer 200 for execution when the client computer 200 is powered-on or reset. In turn, the operating system 214 then controls the execution of one or more computer programs 216, such as software for reporting when an advertisement has been played/displayed. The present invention is generally implemented in these computer programs 216, which execute under the control of the operating system 214, and cause the client computer 200 to perform the desired functions as described herein.

The operating system 214 and computer programs 216 are comprised of instructions which, when read and executed by the client computer 200, cause the client computer 200 to perform the steps necessary to implement and/or use the present invention. Generally, the operating system 214 and/or computer programs 216 are tangibly embodied in and/or readable from a device, carrier, or media such as memory 204, data storage devices 206, and/or data communications devices 208. Under control of the operating system 214, the computer programs 216 may be loaded from the memory 204, data storage devices 206, and/or data communication devices 208 into the memory 204 of the client computer 200 for use during actual operations.

Thus, the present invention may be implemented as a method, apparatus or article of manufacture, using standard programming and/or engineering techniques to produce software, firmware, hardware, or any combination thereof. The term "article of manufacture" (or alternatively, "computer program product") as used herein, is intended to encompass a computer program accessible from any computer-readable device, carrier, or media. Of course, those skilled in the art will recognize many modifications may be made to this configuration without departing from the scope of the present invention.

Those skilled in the art will also recognize that the environment illustrated in FIG. 2 is not intended to limit the present invention. Indeed, those skilled in the art will recognize that other alternative hardware environments may be used without departing from the scope of the present invention. It will also be appreciated that various embodiments employ more than one server device. Furthermore, a particular physical device can be considered a server in one context, and a client in another context, depending on whether the device is serving information to another device, or requesting and consuming information. Thus an ad proxy can be considered to be a server in the context of providing a playback manifest to a content distribution network (CDN), and a client in the context of requesting advertising content from an ad sever.

Figure 3:
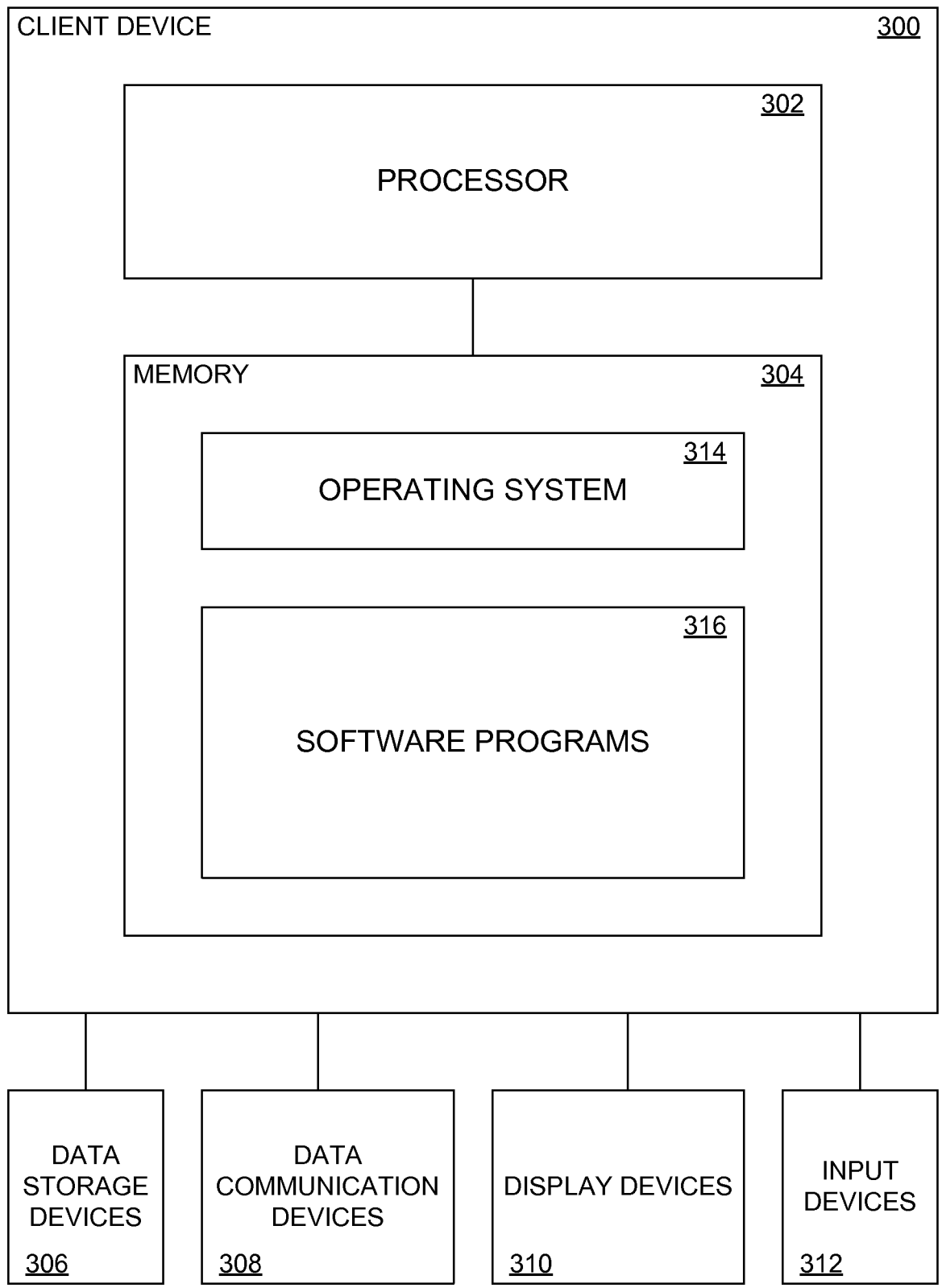
FIG. 3 is a schematic diagram illustrating a hardware environment used to implement a client device in one embodiment of the invention.

FIG. 3 is a schematic diagram illustrating a hardware environment used to implement a client device 300. Client device 300 can be a consumer device, such as an appliance, a personal digital assistant (PDA), a wrist watch, a stand-alone Internet radio, a set top box, or a television system, or other consumer device, as well as a general computing device such as personal computers including but not limited to a laptop computer, a desktop computer, or a tablet device. Client device 300 generally includes a processor 302, a random access memory (RAM) 304, data storage devices 306 (e.g., hard, floppy, and/or CD-ROM disk, drives, etc.), data communications devices 308 (e.g., modems, network interfaces, etc.), display devices 310 (e.g., CRT, LCD display, etc.), and input devices 312 (e.g., mouse pointing device, keyboard, CD-ROM drive, etc.). Other devices, such as read only memory (ROM), a video card, bus interface, printers, etc. can be attached to or included in client device 300. Those skilled in the art will recognize that various combinations of the above components, or any number of different components, peripherals, and other devices, may be used with the client device 300.

Client device 300 operates under control of an operating system (OS) 314. Operating system 314 can be booted into the memory 304 of the client device 300 for execution when the client device 300 is powered-on or reset. In turn, operating system 314 can control the execution of one or more software programs 316, such as software for reporting when an advertisement has been played or displayed. Various embodiments are implemented as software programs 316, which execute under control of operating system 314, and cause client device 300 to perform desired functions, some of which are described herein.

Operating system 314 and software programs 316 include instructions which, when read and executed by client device 300, cause client device 300 to perform operations useful in implementing various embodiments of the present invention. The operating system 314 and software programs 316 can take the form of a computer readable medium, which is readable from a device, carrier, or media such as memory 304, data storage devices 306, data communications devices 308. Under control of the operating system 314, the software programs 316 may be loaded from the memory 304, data storage devices 306, data communication devices 308 into the memory 304 of the client device 300 for use during actual operations.

Thus, various embodiments can be implemented as a method, apparatus or article of manufacture, using standard programming or engineering techniques to produce software, firmware, hardware, or any combination thereof. The term "article of manufacture" (or alternatively, "software program product") as used herein, is intended to encompass a software program accessible from any computer-readable device, carrier, or media. Of course, those skilled in the art will recognize many modifications may be made to this configuration without departing from the scope of the present invention.

Figure 5:
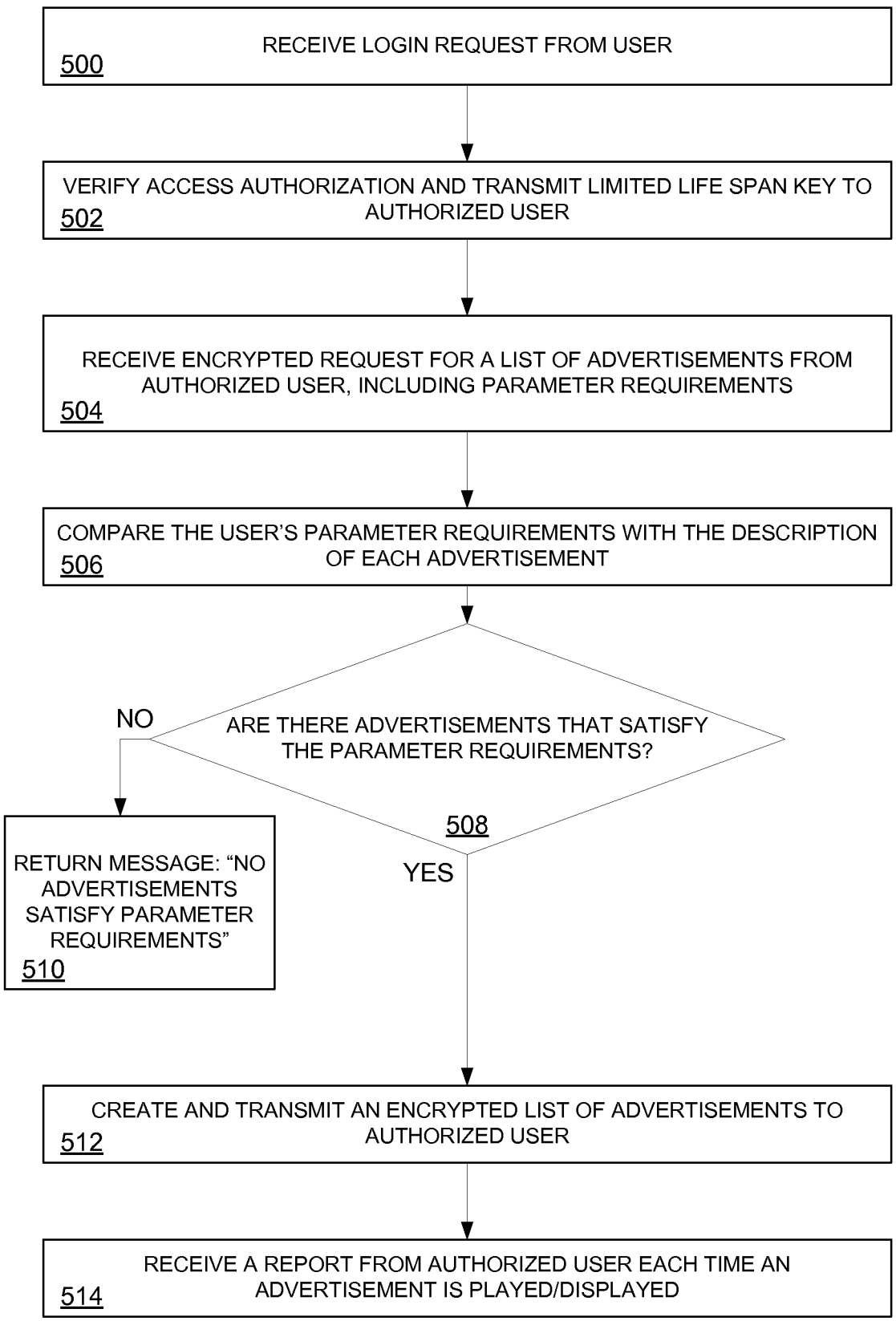
FIG. 5 is a flow diagram illustrating a process performed by the Third Party Advertising System.

Those skilled in the art will also recognize that the environment illustrated in FIG. 5 is not intended to limit the present invention. Indeed, those skilled in the art will recognize that other alternative hardware environments may be used without departing from the scope of the present invention.

Figure 4:
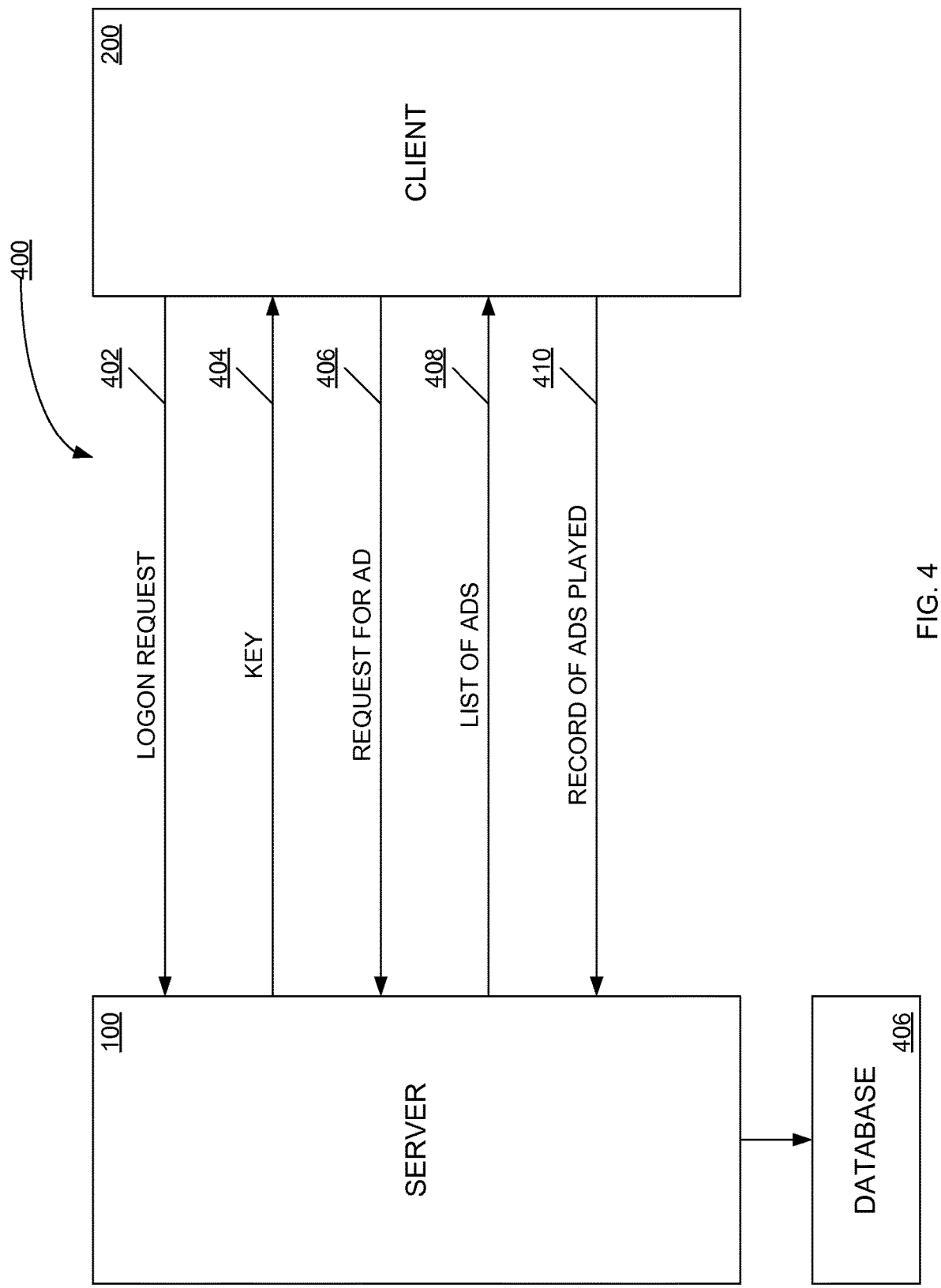
FIG. 4 is a schematic diagram illustrating a client/server computer environment of an embodiment of the present invention.

FIG. 4 is a schematic diagram illustrating a client/server computer environment of an embodiment of the present invention, and more particularly, illustrates a typical distributed computer system 400 using the Internet to connect the server computer 100 to the client computer 200.

The server computer 100 is connected to a database 406 that contains user logon authorization information and information about the available data items. In FIG. 4, the data items are advertisements. Those skilled in the art will recognize that other data items may be used without departing from the scope of the present invention.

The logon authorization information includes client identifiers (e.g., usernames and passwords) for users that are authorized to access the TPAS system. The advertisement information includes, but is not limited to the following: (1) the title of the advertisement; (2) the spot identification number; (3) the flight identification number; (4) the spot Universal Resource Locator (URL); (5) the click action URL; (6) the duration; and (7) the description.

The title of the advertisement provides a descriptive title and the spot identification number is based on the type of advertisement. For example, a banner advertisement may have a different spot identification number than an audio advertisement. The flight identification number is associated with the following: the target audience of an advertisement; the period of time during which a particular advertisement is played/displayed; and the number of times that the advertisement will be played/displayed. The spot URL and the click action URL define the location of the advertisement. The duration defines the time length (e.g., five seconds) of the advertisement. The description contains a written description, possibly provided by the advertiser, possibly automatically provide by information stored within the TPAS system or gathered from information received by third party sources from outside of the TPAS system.

A user at a client computer 200 invokes the TPAS. The user could be a content provider, such as an Internet radio station or a music on demand Web site, an audio server that provides content to a broadcast chain, a cloud-based media provider, or a Web site that provides content. Alternatively, the user can be a consumer, including an advertiser. At the server computer 100, the TPAS system requests the logon authorization information from the user. The logon authorization information includes the user's interface version, client identifier, and GMT time. Arrow 402 represents the client computer 200 sending a logon request to the server computer 100. It is noted that all communication between the client computer 200 and the server 100 computer is in XML, and each communication has a specific header that identifies the content of the communication. For example, the communication may be a logon communication, a request communication, etc.

To determine whether a user is an authorized user, the TPAS system compares the client identifier information with the logon authorization information contained in the database 406. When a match exists, the TPAS returns a limited life span key to the user, as represented by Arrow 404. This limited life span key provides the user with the ability to encrypt data and decipher encrypted data. The limited life span key is active for a predefined time duration (e.g., ten minutes).

The user uses the limited life span key to encrypt and send a request for targeted advertisement options, as represented by Arrow 406. The request contains parameter requirements, including audience demographic requirements and/or content requirements. The audience demographic requirements include, but are not limited to, age, gender, geographic location, interests, education, income, and musical format.

In one embodiment, the location demographic requirement includes the real time location. For example, assume that the content provider seeks to provide an advertisement to someone that is standing in front of a coffee shop. The content provider will then request advertisement options that are related to that particular coffee shop.

The musical format, includes any compressed format (e.g., WMP, WMA, WAV, Real, QT, MP3, MP4, Liquid, or Emblaze). Other content requirements include, but are not limited to, spot type, gateway, inserted, audio or video, audio format, file wrapper format, graphic, encoding, encoding rate, and Codec. Exemplary spot types include, but are not limited to, a promotional advertisement, a gateway advertisement, a banner advertisement, a commercial advertisement, or a "jingle."

The TPAS compares the parameter requirements with the advertisement descriptions. The TPAS then uses XML to create a list that contains each advertisement which satisfies the parameter requirements. Each advertisement is tagged (or affixed) with its advertisement information.

Next, the TPAS encrypts the XML list, and returns the encrypted list to the client computer, as represented by Arrow 408. The client computer uses its limited life span key to decrypt the XML list of targeted advertisements.

The user may select one or more targeted advertisements from the list. The user can then purchase the selected, targeted advertisements from any advertisement provider. When the purchased advertisements are played and/or displayed, the client computer sends a XML report to the TPAS, as represented by Arrow 410. The report is a specified XML schema that includes, but is not limited to: the client identification number, the spot identification number, the flight identification number, the start and stop play/display time in GMT, and the number of times that the advertisements was played/displayed.

FIG. 5 is a flow diagram illustrating the process performed by the TPAS. Block 500 represents the TPAS receiving a logon request from a user. When the user is an authorized user, the TPAS transmits a limited life span encryption key, as represented by Block 502.

Block 504 represents the TPAS receiving an encrypted request for a list of targeted advertisements from the authorized user. The request includes parameter requirements, including audience demographic requirements and content requirements. The TPAS then compares the parameter requirements with the descriptions of each advertisement, as represented by Block 506.

Block 508 is a decision block that represents the TPAS determining whether there are any advertisements that satisfy the parameter requirements. When there are advertisements that satisfy the parameter requirements, the TPAS creates and transmits the list of targeted advertisements to the authorized user, as represented by Block 512. The TPAS then proceeds to Block 514.

Block 514 represents the TPAS system receiving an XML report from the authorized user each time a targeted advertisement is played and/or displayed, attempts to play or display, or is otherwise ordered, requested, or scheduled to play or display.

Otherwise, when no advertisements satisfy the parameter requirements, the TPAS may return a message stating that: "no advertisements satisfy the parameter requirements~," or other similar message, as represented by Block 510.

Figure 6:
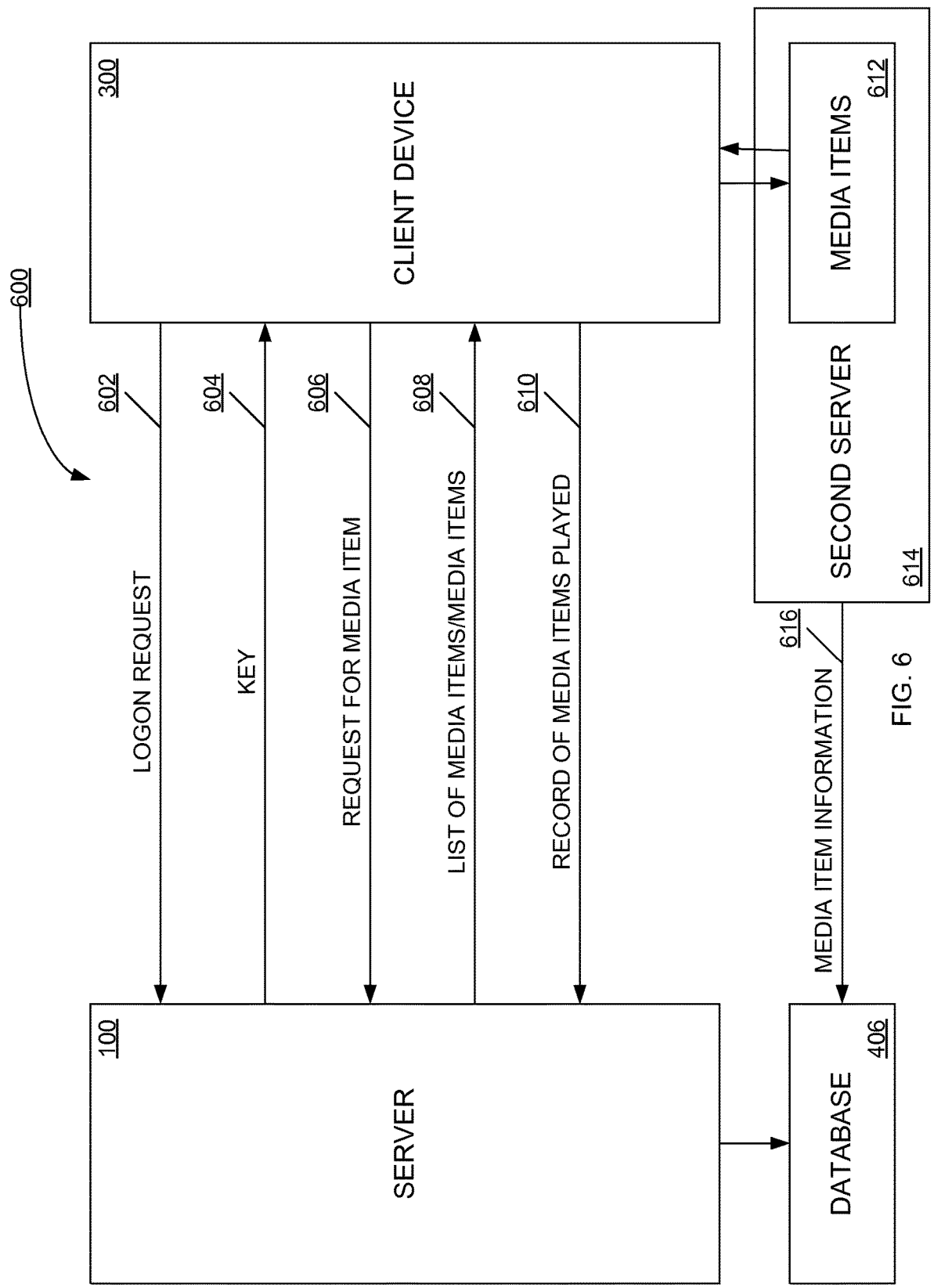
FIG. 6. is a schematic diagram illustrating a client/server computer environment of an embodiment of the present invention.

FIG. 6 is a schematic diagram illustrating a client/server computer environment of an embodiment of the present invention, and more particularly, illustrates a typical distributed computer system 600 using the Internet to connect the server computer 100 to the client device 300.

The server computer 100 is connected to a database 406 that contains user logon authorization information and information about the available data items. In FIG. 6, the data items are media items 612, which are retrieved using a second server 614. The second server 614 can be the server computer 100. Information on media items 612 that are retrieved using second servers 614 other than server computer 100 can be retrieved using the second servers 614 and stored on the database 406. Those skilled in the art will recognize that other data items may be used without departing from the scope of the present invention.

The logon authorization information may include client identifiers (e.g., usernames and passwords) for users that are authorized to access the TPMDS system. The media item information includes, but is not limited to the following: (1) the title of the media item; (2) the media item identification number; (3) the flight identification number; (4) the media item Universal Resource Locator (URL); (5) the click action URL; (6) the duration; and (7) the description.

The title of the media item may provide a descriptive title and the media item identification number is based on the type of media. For example, a talk radio program may have a different media item identification number than a music video. The flight identification number is associated with the following: the target audience of a media item; the period of time during which a particular media item is played/displayed; and the number of times that the media item 612 will be played/displayed. The spot URL and the click action URL define the location of the media item 612; they can also define the location of the media item if the media item 612 is to be retrieved using a second server 614 that is not the server computer 100. The duration defines the time length (e.g., ten minutes) of the media item. A spot block identifier can also be included. The description contains a written description, possibly provided by the media provider.

In some embodiments, the TPAS may be configured to respond to spot break split information received from broadcast automation software. The spot break split information can include information indicating which portion of as spot break is reserved for the TPAS to use for inserting targeted advertisements.

A user at a client device 300 invokes the TPMDS. The user could be a media provider, such as an Internet radio station or a music on demand Web site, an audio server, or a Web site that provides media. Alternatively, the user can be a consumer, an advertiser or a client. At the server computer 100, the TPMDS system requests the logon authorization information from the user. The logon authorization information may include the user's interface version, client identifier, and GMT time. Arrow 602 represents the client device 300 sending a logon request to the server computer 100. It is noted that some or all communication between the client device 300 and the server 100 computer may be in XML, and may have a specific header that identifies the content of the communication. For example, the communication may be a logon communication, a request communication, etc.

To determine whether a user is an authorized user, the TPMDS system compares the client identifier information with the logon authorization information contained in the database 406. When a match exists, the TPMDS returns a limited life span key to the user, as represented by Arrow 604. This limited life span key provides the user with the ability to encrypt data and decipher encrypted data. The limited life span key is active for a predefined time duration (e.g., ten minutes).

The user may use the limited life span key to encrypt and send a request for targeted media options, as represented by Arrow 606. The request contains parameter requirements, including audience demographic requirements and/or media requirements. The audience demographic requirements include, but are not limited to, age, gender, geographic location, interests, education, income, and musical format.

In one embodiment, the location demographic requirement includes the real time location. For example, assume that the media provider seeks to provide a media item to someone that is living in the state of New York. The media provider will then request media options that are related to the state of New York.

The musical format includes any compressed format (e.g., WMP, Real, QT, MP3, MP4, Liquid, or Emblaze). Other media requirements include, but are not limited to, media type, gateway, inserted, audio or video, audio format, file wrapper format, graphic, encoding, encoding rate, and Codec. Exemplary media types include, but are not limited to, an advertisement, a music video, a song, or a radio program.

The TPMDS can compare the parameter requirements with the media item information on the database 406. The TPMDS may then use XML to create a list that contains an entry for each media item which satisfies the parameter requirements. Each media item entry can be tagged (or affixed) with its media item information. If a media item 612 is to be retrieved using a second server 614 that is not the sever computer 100, the media item information tagged with the media item entry can include the identification of the second server 614 through which the media item 612 is to be retrieved.

Next, the TPMDS encrypts the XML list, and returns the encrypted list to the client device 300, as represented by arrow 608. The client device 300 uses its limited life span key to decrypt the XML list of targeted media item entries.

The user may select one or more targeted media item entries from the list. The user can then purchase or otherwise obtain the selected, targeted media item 612 from any media provider, including those media items located on a second server 614. When the media items 612 are played or displayed, the client computer may send a report, e.g., a XML report, to the TPMDS, as represented by arrow 610. The report may be a specified XML schema that includes, but is not limited to: the client identification number, the media item identification number, the flight identification number, the start and stop play/display time in GMT, and the number of times that the media item was played/displayed.

Figure 7:
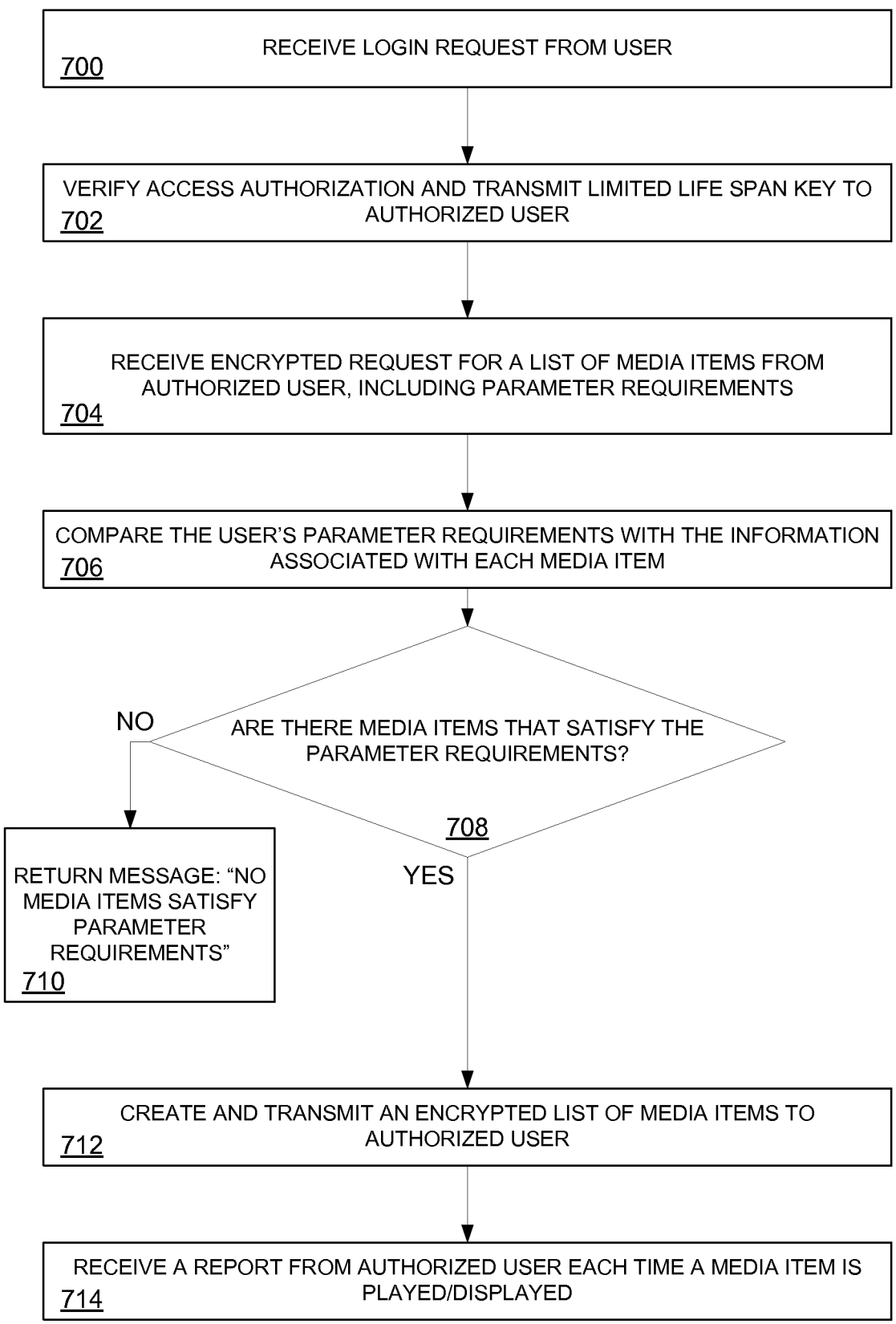
FIG. 7 is a flow diagram illustrating the process performed by the Third Party Media Distribution System.

FIG. 7 is a flow diagram illustrating the process performed by the TPMDS. Block 700 represents the TPMDS receiving a logon request from a user. When the user is an authorized user, the TPMDS transmits a limited life span encryption key, as represented by Block 702.

Block 704 represents the TPMDS receiving an encrypted request for a list of targeted media items from the authorized user. The request includes parameter requirements, including audience demographic requirements and content requirements. The TPMDS then compares the parameter requirements with the descriptions of each media item, as represented by Block 706.

Block 708 is a decision block that represents the TPMDS determining whether there are any media items that satisfy the parameter requirements. When there are media items that satisfy the parameter requirements, the TPMDS may create and transmit the list of targeted media items, including information on the location of the targeted media items, to the authorized user, as represented by Block 712. The TPMDS then proceeds to Block 714.

Block 714 represents the TPMDS system receiving an XML report from the authorized user each time a targeted media item is played and/or displayed, or attempts to play or display, or is otherwise ordered, requested or scheduled to play or display.

Otherwise, when no media items satisfy the parameter requirements, the TPMDS may return a message stating that: "no media items satisfy the parameter requirements," or other similar message, as represented by Block 710.

Referring next to FIGS. 8-12, various methods, systems, and devices for splitting a single spot break, will be discussed. Those skilled in the art will appreciate that streaming spots are generally of a one-to-many listener distribution process. However, it is possible to send a signal and target ads using a one-to-one listener distribution. Various embodiments described herein allow the particular type of ad delivery process used (e.g. one-to-many or one-to-one) to be varied within a single spot break. The way in which a spot break is split up can be determined based on size (length) allocated to spot versus commercials sold at each rate, and may use an internal ad management system priority code. Part of the spot break may be allocated to an internal ad management system and the rest to an external ad management system, or the whole spot break may be allocated to either an internal ad management system or an external ad management system.

In some embodiments, control of different spot breaks within a particular period of time can be implemented in a manner similar to splitting a single spot break. For example if there are two spot breaks within an hour, they can be split so that the first spot break in its entirety corresponds to the first portion of a single spot break, and is controlled by a first ad management server, while the second spot break in its entirety corresponds the second portion of a single spot break, and ads are inserted into the second spot break under control of a second ad management server. Other time periods in which control of different spot breaks can be split between different ad management servers include any of various dayparts, As opposed to more conventional techniques, in which insertion of advertisements is performed under control of a single entity, the techniques described in the following discussion can be used to allow, for example, one entity to insert universally applicable advertisements into one part of a spot break, while another entity can insert targeted advertisements into another portion of the spot break. In various embodiments, either or both of the first and second entities can insert filler in addition to, or in place of, advertisements.

The phrase, "universally applicable advertisements" and other similar terms are used herein to refer to advertisements intended for an entirety of an audience consuming media presented on a particular channel, or station, while the phrase "targeted advertisements" refers to advertisements selected for a subset of the entire audience, such as a group of listeners having one or more similar demographic attributes, or with granularity that can be as small as an individual listener. It will be appreciated that universally applicable advertisements may be targeted to the extent that they are targeted to the majority of media consumers receiving media content from the broadcast or stream, but such "universal targeting" is performed at a different level of granularity. Another distinction between universal advertisements and targeted advertisements (keeping in mind that universal advertisements can be targeted broadly to an entire audience) is that different targeted advertisements can be provided, concurrently or non-concurrently, to different media consumers of particular media programming, while universal advertisements are intended to be provided to the audience as a whole.

The difference between universal advertisements and targeted advertisements, as those terms are used herein, can be understood by considering an example in which a single advertisement is provided to consumers of a program on both a broadcast channel, and on each and every individual stream representing that particular broadcast channel. By contrast, targeted advertisements refer to advertisements that can be provided to different consumers of the same or different media streams based on more individualized consumer preferences and/or demographics. Assume, for example 70% of the listeners to a classic rock radio station may be between the ages of 30 and 45. Thus, universal advertisements can be selected to appeal to that 70% of listeners. Assuming, however, that 10% of the listeners are listening online via a streaming media player, and those listeners have identifiable preferences and demographics that do not match the 70%, those listeners can each be provided with individually customized advertisements, or demographically customized advertisements, during at least a portion of the spot break.

As used in the following discussion, reference to controlling a spot break refers generally to controlling which advertisements are inserted into one or more portions of the spot break, and in some cases the order in which those advertisements are inserted within that portion. Reference to splitting a spot break refers to dividing control of a block of time in a media broadcast or stream that is used generally for presenting advertisements, and in some cases filler, to media consumers. In some cases splitting a spot break also refers to dividing spot break into universal and targeted portions. Note that splitting a spot break does not include splitting a spot break between advertisements and filler, with no split in control or universal/targeted content. Furthermore, although some of the embodiments discussed herein involve splitting a spot break into two different portions, the techniques are equally applicable to splitting a spot break into more than two portions. For example, a single spot break can be split into three, four, five or more spots.

Additionally, a spot break divided into multiple portions can be combined or recombined, either partially or fully, to decrease the number of different portions. For example, if a spot break is divided into 4 different portions, the last three portions can be recombined, leaving the original first portion and a recombined second portion. Similarly, the middle two portions can be combined, leaving the original beginning and end portions, and a single recombined middle portion. Recombining different portions can be performed when an ad management system assigned to control one of the portions does not have sufficient content, or sufficient quality of content, for insertion during its assigned portion of the spot break. Combining two spot break portions can be performed on-the-fly, and can include passing control of an assigned portion of a spot break either early or late, or passing control to a standby system.

Figure 8:
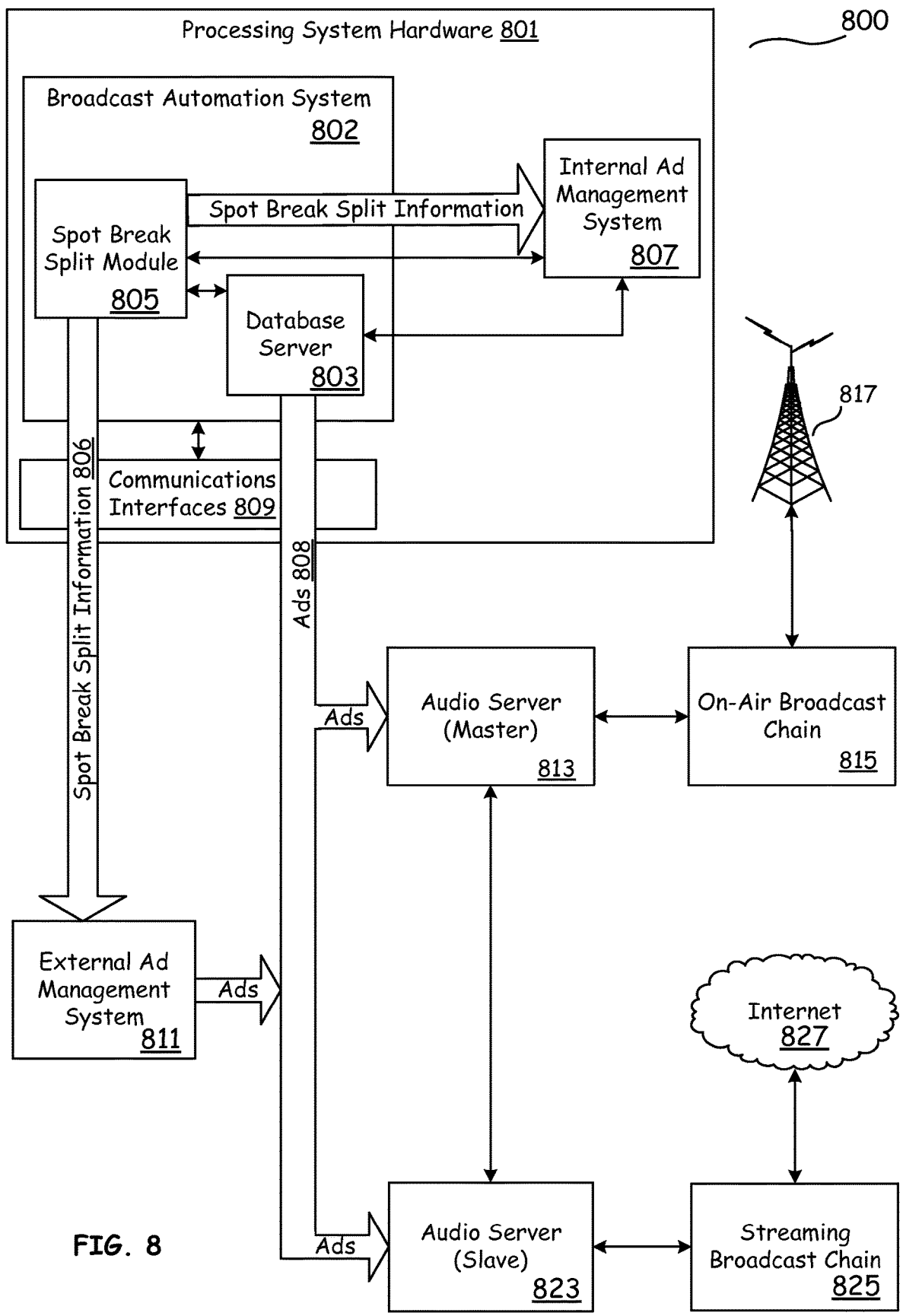
FIG. 8 is a block diagram illustrating a system implementing split spot breaks according to various body the present disclosure.

Referring to FIG. 8, an implementation of a system 800 configured to split control of a single spot break is illustrated and discussed according to various embodiments of the present disclosure. System 800 includes processing system hardware 801, which can be used to control and automate various media broadcast functions. System 800 also includes streaming audio server 823, which provides content and advertisements to streaming broadcast chain 825, through which a streaming broadcast of media content can be provided to a network such as Internet 827; over the air audio server 813, which provides content and advertisements to on air broadcast chain 815, through which media content can be broadcast via a broadcast tower 817; and external ad management system 811, which provides advertisements during designated portions of a split spot break to audio servers 813 and 823.

Processing system hardware 801 includes broadcast automation system 802, which in at least one embodiment can be at least partially implemented using a NexGen® audio server; internal ad management system 807, which in at least one embodiment can be implemented at least partially using a traffic and billing system such as Viero®, and can be used to provide control for various traffic and billing functions such as entering and editing orders, and scheduling spots based at least in part on the spot break split information 806 received from spot break split module 805; and communications interface 809, which allow processing system hardware 801 to communicate via various different communications networks.

Broadcast automation system 802 includes database server 803, which provides content to one or both of over-air audio server 813 and streaming audio server 823, and spot break split module 805, which determines how a spot break should be split, and may notify internal ad management system 807 and external ad management system 811. For example, spot break split module 805 can be used to determine whether a particular percentage of a spot break should be reserved for universal advertisements, and the remaining portion reserved for targeted advertisements; which portion of the spot break could be controlled by internal ad management system 807, and which portion by external ad management system 811; whether the split proportions of the spot break could be reallocated based on the length of currently scheduled advertisements; and the like.

In at least one embodiment, processing system hardware 801 and its subcomponents can be implemented as virtual servers implemented on the same hardware as another of the illustrated devices or modules. Furthermore, various distributed processing techniques can be used to spread functionality of one or more of the illustrated servers across multiple different machines.

In various embodiments, programming provided by streaming audio server 823 to streaming broadcast chain 825 is the same programming provided by over-air audio server 813 to on air broadcast chain 815. In many instances, however, particular spots, or advertisements, included in the various spot breaks provided to on air broadcast chain 815 and streaming broadcast chain 825 can vary, even though the length and timing of the spot breaks themselves are generally consistent with each other.

In some implementations, it is desirable to be able to provide universal advertisements to all media consumers for part of the spot break, but provide targeted advertisements to some of the media consumers during another part of the spot break. Thus, for example, all consumers might receive two universal advertisements at the beginning of a spot break, while during the second part of the spot break some consumers will receive additional universal advertisements, while others will receive targeted advertising in place of the universal advertisements.

The proportion of universal advertisements to targeted advertisements received by certain consumers can be determined by spot break split module 805, and that proportion can be communicated to internal ad management system 807 and external ad management system 811. In various embodiments, spot rate module 805 can provide information to internal ad management system 807 and external ad management system 811 that designates a number of portions into which any particular spot break is to be split, a length of one or more of the particular portions of the spot break, a start time of one or more spot break portions, and end time of one or more spot break portions, or some combination of these. Various embodiments provide for different spot breaks to be split differently, providing for dynamically varying how different spot breaks are split, including dynamically varying the relative lengths of the first and second portions for different spot breaks.

In some embodiments, information specifying a spot break length may not actually be provided to the ad management systems 807 and 811. Instead, a start signal can be delivered to whichever ad management system is placed in control of a beginning portion of the spot break, and a message passing control from the initial ad management system can be delivered to the subsequent ad management system at or near the end of the beginning portion of the split spot break. In some embodiments, the message passing control from the initial ad management system to a subsequent ad management system can come in the form of a marker in the data stream being delivered to a content distribution network, such as streaming broadcast chain 825. In at least one embodiment, this marker is received and interpreted by streaming broadcast chain 825. The marker can indicate a length of time an ad insertion module, for example external ad management system 811, should be allowed to control advertisement insertions into the broadcast stream.

In other embodiments, control can be passed in other ways. For example, (1) an ad management systems can be synched to a common time clock for ad breaks, and particular ad management systems automatically assume control as specified by the common time clock; (2) ad management systems can respond to one or both of begin-control and end-control markers included in content, or in discrete messages from a centralized ad controller; (3) an ad management system can insert ads into a portion of a spot break based on a combination of synching to a time clock and content markers; (4) a content detection/recognition system can detect periods of no content, or silence, signaling ad break and initiate a change in control of ad-insertion from one management system to another; (5) an ad management system can recognize a song or other specific content item being played out, use that knowledge to determine when play-out of the media item will be completed, and synch to a clock so that specifies an ad break at upon completion of play-out of the media item.

During a time when an ad management system controls its designated portion of the spot break, the controlling ad management system can insert advertisements according to various business rules. These business rules can specify types of advertisements allowed to be played adjacent to each other, target information indicating how the advertisement should be targeted, and priority information indicating whether a particular advertisement, advertiser, group of advertisements, type of advertisement, or the like are to be given priority over other categories of advertisements. Examples of business rules that can be used to assist in assigning control of portions of an ad break to various management systems, or used in assigning particular advertisement can be found in the following patents, each of which is incorporated by reference herein in its entirety: U.S. Pat. No. 7,386,492, entitled, "Inventory And Revenue Maximization Method And System"; U.S. Pat. No. 7,941,350, entitled, "Inventory And Revenue Maximization Method And System"; U.S. Pat. No. 8,230,460, entitled, "Real-Time Insertion And Reporting Of Media Content"; U.S. Pat. No. 8,356,037, entitled, "Processes To Learn Enterprise Data Matching"; and U.S. Pat. No. 8,443,046, entitled, "Automated Content Delivery To Distributed Media Outlets."

In various embodiments, an ad management system can pass information to one or more other ad management systems to assist in implementation of various business rules. For example, a first ad management system scheduled to control insertion of advertisements into an earlier portion of a spot break can send an Ad Conflict message to a second advertisement system, which is scheduled to control insertion of advertisements into a later portion of the same spot break. The Ad Conflict message can include information about advertisements being inserted, or scheduled to be inserted by, the first ad management system. This information can include conflict information, content identifiers, rule identifiers, or similar information that can be used by the second ad management system to identify and attempt to minimize or avoid potential advertiser adjacency conflicts. For example, the first ad management system can notify the second ad management system that an ad for Cell Phone Provider A is being inserted, and include a rule reference identifier that specifies no advertisements from Cell Phone Provider B are to be played within the same spot break as an ad for Cell Phone Provider A. The second ad management system can look up the rule reference identifier, and take actions as needed to prevent insertion of a prohibited ad into a later portion of the ad break. As needed, the second ad management system can schedule an alternate ad or fill to replace a prohibited ad, pass control to another ad management system, or pass control back to the first ad management system.

In some implementations, the second ad management system can pass an Ad Conflict message to the first ad management system, allowing the first ad management system to take corrective action if needed. In various embodiments, multiple ad management systems can coordinate among themselves in an iterative manner to ensure that various business rules are complied with. Furthermore, some or all of the same information included in an Ad Conflict message of some implementations can be sent alternatively or additionally in a Change of Control message, or as part of another message delivered directly or indirectly to or from an ad management system.

In some embodiments, the message indicating the change of control between the two ad management systems can be transmitted from the initial ad management system to the subsequent ad management system, while in other embodiments, spot break split module 805 can transmit the message. In various implementations, splitting the spot break and insertion of advertisements into split spot breaks can be performed in advance, rather than in near real-time. For example, during generation of a radio station's clock or log, spot breaks foot module 805 can instruct internal ad management system 807 to schedule advertisements and fill in only the first 75 seconds in a 130 second spot break, and instruct external ad management system 811 to provide advertisements and fill for the remaining 55 seconds of the spot break.

Figure 9:
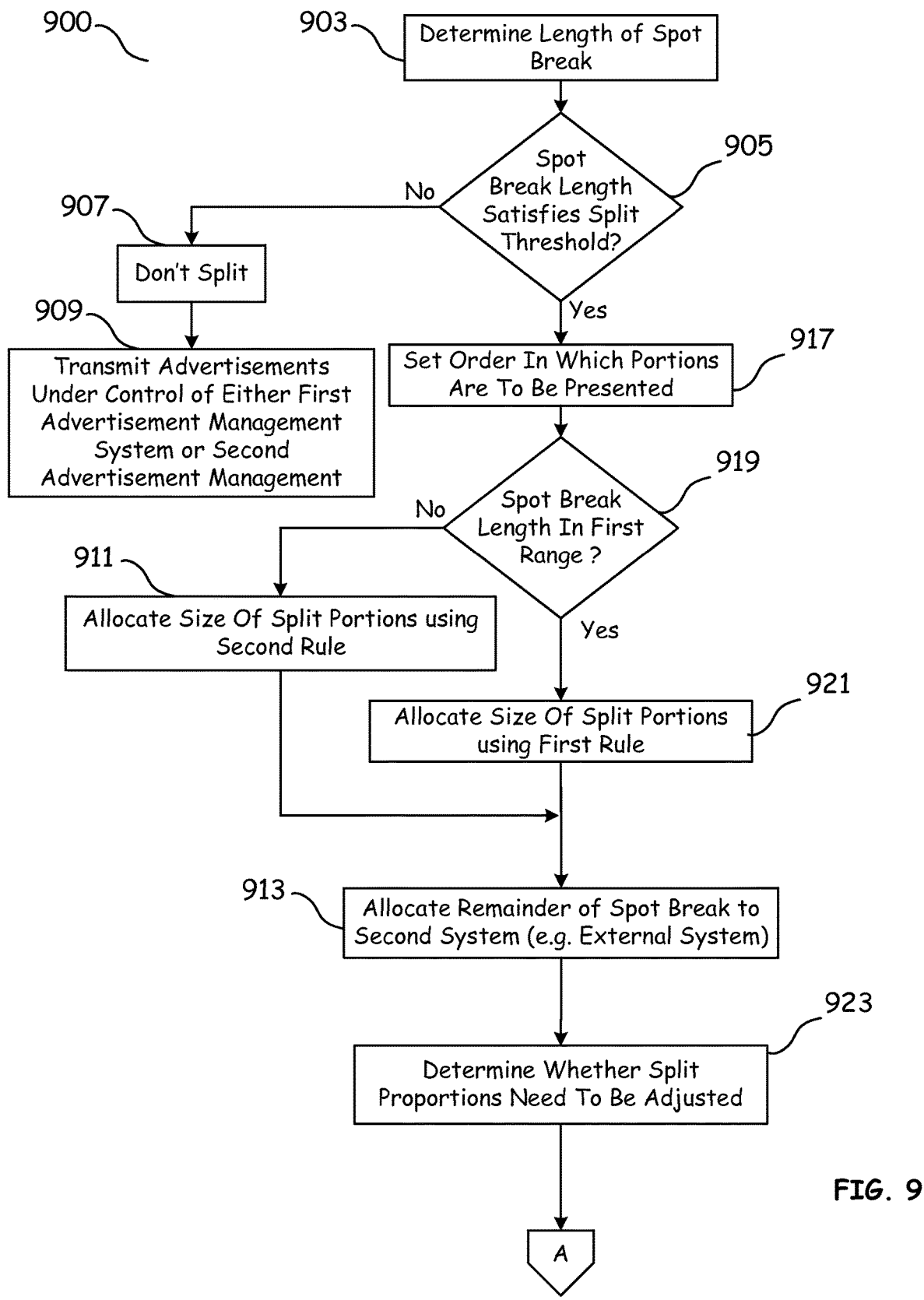
FIG. 9 is a flowchart illustrating method of splitting spot breaks according to various embodiments of the present disclosure.

Referring next FIG. 9, a method 900 according to various embodiments of the present disclosure will be discussed. At block 903 length of the spot break is determined. The length of the spot break can be determined from a program clock were station log. A check is made to determine whether the length of the spot break satisfies a split threshold, as illustrated by block 905. In various embodiments, it is desirable to leave very short spot breaks intact, without being split, because splitting very short spot breaks could prevent some longer advertisements from running, and results in shorter spot breaks having fewer advertisements and more fill. In at least one embodiment, the split threshold specifies that spot breaks having a length of 74 seconds or less are not to be split. Note that the split threshold can be configured differently for each individual station, so that although a 76 second spot break will be split into two portions for a first station, that same 76 second spot break will not be split for a second station.

As noted earlier, splitting a spot break can refer to dividing control between an internal ad management system and an external ad management system, and/or splitting a spot break between universal and targeted advertisements. Likewise, the split threshold can refer to a division of control between different ad management systems, and/or dividing a spot break between universal and targeted advertisements.

Furthermore the rule can be specified for implementation at either or both an internal ad management system or an external ad management system.

As illustrated by block 907, if the spot break is determined to be too short to split, the spot break is not split. As illustrated by block 909, if the spot break is not split, advertisements can be transmitted under control of a single advertisement management system, either the first advertisement management system for a second advertiser management system. In cases where a single advertisement management system manages the entire spot break, but provides some targeted advertisements in some universal advertisements, one type or the other of advertisement can be provided—for example, either all universal or all targeted. Note that use of the terms "first" and "second" is not intended to refer to an order, or sequence, but rather these terms are used simply to differentiate one advertisement management system from another.

If it is determined at block 905 that the length of the spot break sufficient to satisfy the split threshold, an order in which the different portions of the spot break are to be presented is determined that block 917. Note that in various embodiments, the universal advertisements are always presented during a portion of a spot break that is first in time, and the targeted advertisements are assigned to any remaining portion of the spot break that is unused by the universal advertisements. Similarly, in some such embodiments ad management systems responsible for delivering primarily universal advertisements are always assigned a beginning portion of a spot break, and ad management system responsible for delivering primarily targeted advertisements are allotted the remaining, or terminal, portion of the spot break on use by the ad management system delivering the universal advertisements.

At block 919 a determination is made regarding whether the spot break total length falls within a first range. If the length of the spot break falls within a first range of links, the internal and external ad management systems are allocated portions of the spot break based on a first rule as illustrated by block 921. If the length of the spot break does not fall within the first range, as illustrated by block 919, the split portions can be allocated using a second rule, as illustrated by block 911. In either case, the remainder of the spot break is allocated to the other of the two ad management systems, as illustrated by block 913.

In some embodiments, the portion of the spot break allocated to the different ad management servers at block 921 can be determined using a tiered model, based on the total length of the spot break. For example, a spot break that meets a first threshold requirement, which may or may not be the same as the split threshold requirement, can result in an internal ad management system being allocated a certain portion of the spot break, while a longer spot break that meets a second threshold would result in the internal ad management system being allocated a greater portion of the spot break, although the increased portion allocated to the internal ad management system is not necessarily coextensive with the increase in the total size of the spot break.

In at least one embodiment, for every 1 min. of length in a spot break, an internal ad management system can be assigned control of Y seconds of the spot break. For example, if a spot break is zero (0) to 74 seconds long, it may not be considered long enough to split. If a spot break is 74 seconds to 134 seconds long, the internal ad management system may be assigned to 60 seconds minimum allocation. For a spot break that is between 135 seconds and 185 seconds long, the internal ad management system may be assigned 120 seconds minimum allocation.

Other spot break lengths and proportions can be used consistent with the teachings set forth herein. For example, Y (the length assigned per minute of spot break length) may be a fixed value, such as 60 seconds, or the value of Y can be varied to provide different length allocations for different tiers of a spot break. In some embodiments, an internal ad management system may be assigned 60 seconds of a spot break having only between 74 seconds and 134 seconds, but be assigned only 90 seconds for spot break between 135 and 185 seconds. A spot break can be assigned to different tiers based on length, and/or based on various business or technical considerations, such as estimated revenue of targeted ads versus universal ads, the cost of delivering targeted ads, whether targeted ads or universal ads will satisfy advertisement campaign requirements, or the like.

In some embodiments, a determination regarding whether or not to adjust the allocated splits is made, as illustrated by block 923. In some embodiments, the decision to adjust the split can be pre-determined on an individual, station-by-station basis. Thus, changing the split might be prohibited by some stations, and allowed by others. Subject to split adjustment being enabled, the decision about whether to adjust the split can depend on how many paid or unpaid advertisements the internal and external ad management systems are prepared to provide, the revenue expected from advertisements provided by the respective systems, how much fill is available, or the like.

In some embodiments determining whether split proportions need to be adjusted, as illustrated by block 923, can include determining whether one or more portions of an ad break are to be combined or recombined, to decrease the number of portions into which a spot break is split. The decision to combine can be based on whether or not particular ad management systems have sold out sufficient inventory to fill their assigned portions, whether a particular spot break will support the number of portions contemplated, whether conflicting ad content is likely to be caused by the split granularity being too fine, whether too fine a granularity would cause various other inventory constraints, or based on other business rules. Combining two spot break portions can be performed on-the-fly, and can include passing control of an assigned portion of a spot break either early or late, or passing control to a standby system.

Figure 10:
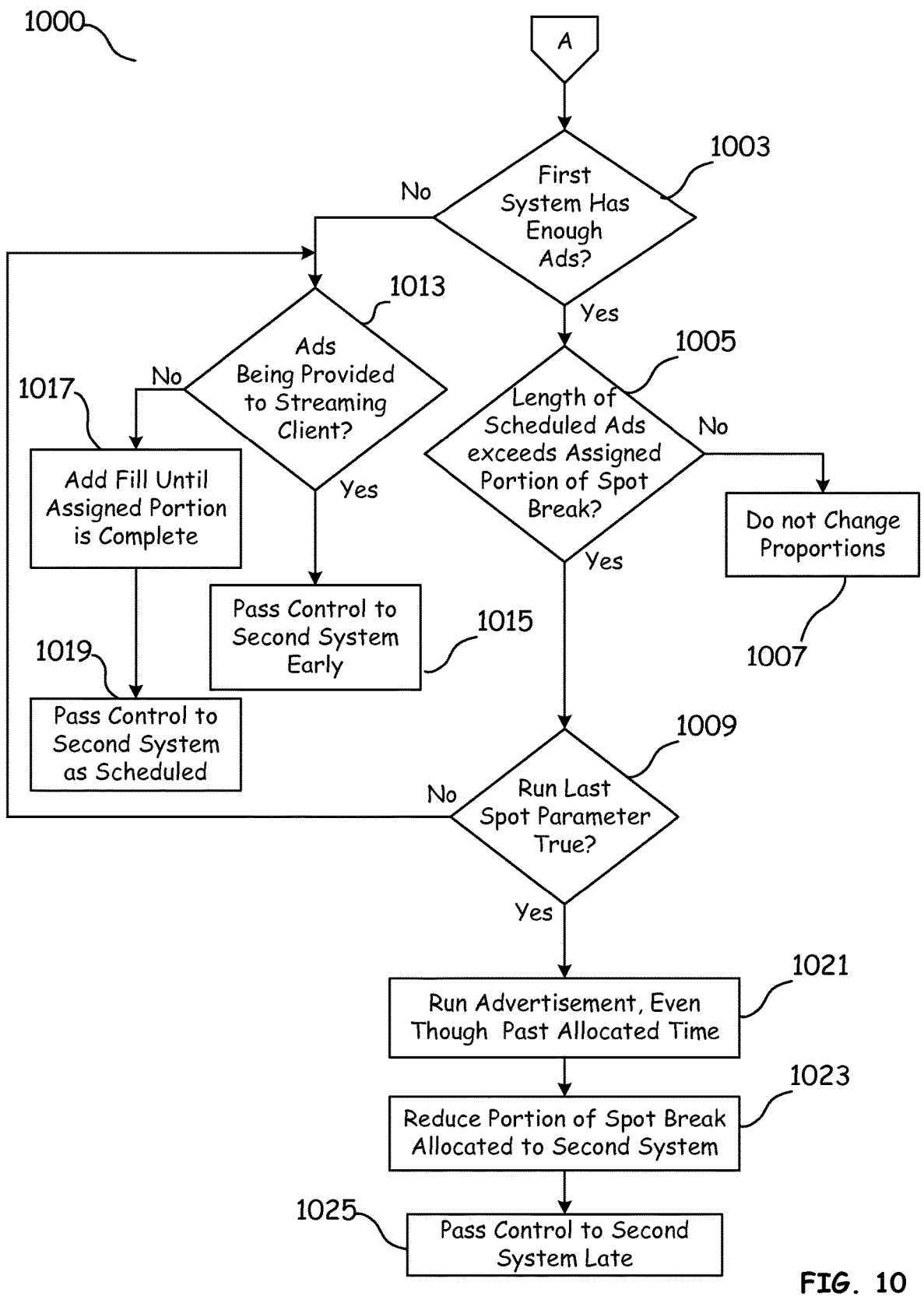
FIG. 10 is a flowchart illustrating methods of adjusting split spot break lengths according to various embodiments of the present disclosure.

Referring next to FIG. 10, the decision about whether or not to adjust the split of a particular spot break split is discussed in greater detail with reference to method 1000. In general, the local ad management system may have too few, just enough, or too many advertisements scheduled for its allocated portion of a spot break. If there are just enough, then the split does not need to be adjusted. If there are too few advertisements, then the first ad management system can either add filler or pass control to the next ad management system early. If too many advertisements are scheduled, there are two different options: 1) run the advertisements as scheduled and pass control late to the next system; or 2) forgo running the excess advertisements and pass control early. Additional filler can, in some cases, be inserted to keep the length of the portion as close to originally planned as practical.

As illustrated by block 1003, a check is performed to determine whether the initial ad management system has enough ads to fill its assigned portion of the split spot block. If the initial ad management system does not have enough advertisements, a check is made to determine whether the advertisements being provided by the first system are being provided to a streaming client, as illustrated by block 1013. If the advertisements are being provided to a streaming client, the first ad management system passes control to the second ad management system early, as illustrated by block 1015. As illustrated by block 1017, if the advertisements are not being provided to a streaming client, the first ad management system, will add fill until its assigned portion of the spot break is complete. As illustrated by block 1019, control is passed to the second ad management system per the originally determined split.

If the first ad management system has enough ads to fill its assigned portion of the spot break, a determination is made at block 1005 to determine whether the length of the scheduled ads being provided by the first ad management system exceed the link of the first ad management system's assigned portion of the spot break. If the length of the scheduled ads does not exceed the assigned portion of the spot break then, as illustrated by block 1007, the split proportions are not changed.

If, however, the length of the scheduled ads does exceed the first ad management system's assigned portion of the spot break a determination is made regarding whether the current ad management system will surrender a terminal portion of its allotted portion of the spot break based, at least in part, on a length of a final advertisement scheduled to be inserted into the first portion of the spot break. Thus, if running the last scheduled advertisement will result in exceeding the assigned portion of the spot break split, another check is made at block 1009 to determine whether or not the run last spot parameter is set to true. If the run last spot parameter is false, the last ad scheduled to be run will not be run, and a decision must be made whether or not to pass control to the next ad management system early, or whether to fill the remaining time freed by deciding not to run the last ad with filler. Thus, if the run last spot parameter is false, the method proceeds from block 1009 back to block 1013.

If however the run last spot parameter is true, as illustrated by block 1021, the last advertisement will be run, even though running the last advertisement will use up more than the first ad management system's allocated portion of the spot break. Because the first ad management system is using up more than its allotted time, as illustrated by block 1023 the portion of the spot break allocated to the second ad management system will be correspondingly reduced, and control will be passed to the second ad management system later than originally determined.

Referring next to FIG. 11, various options for splitting a single spot break will be discussed according to embodiments of the present disclosure. As illustrated by FIG. 11, various different orders of control can be applied to a split spot break, for example, internal first, then external (row 1); external first then internal (row 2); alternating internal and external control for each spot break (row 3); alternating between allowing complete internal control of one break and complete external control of the next break (row 4); a three way split with internal, sellable ads first, external sellable ads second, and fill provided by the internal ad management system (row 5); and a three way split with external, sellable ads first, internal sellable ads second, and fill provided by the external ad management system (row 6).

Each row of the table shown in FIG. 11 illustrates a different split order, with the columns representing various consequences of selecting a particular split order. For example, row one shows a split order in which an internal ad management system is given control of the initial portion of the spot break, and external, or third-party, ad management system is given control of the second portion of the spot break. The listening experience perceived by a media consumer refers to the order in which the consumer may be provided with content. For example, in row one, a listener will hear advertisements provided by the internal ad management system, followed by fill provided by the internal ad management system, followed by advertisements provided by the third-party ad management system, followed by fill provided by the third-party ad management system. In some embodiments this would result in universal/national ad, universal/national fill, targeted/local ads, and finally targeted/local fill.

The category conflict column indicates whether or not there is a potential for conflict between advertisement categories. A category conflict can occur, for example, when a universal/national advertisement for one type of product has the potential to be followed by a targeted advertisement for a competing product of the same type. Typically, category conflicts are handled by the ad management server controlling advertisement insertion into the spot break. But in some embodiments, ad insertion for different portions of a single ad break is controlled by different ad management servers, and category conflicts have the potential to arise between the ad management servers. Because a single ad management server does not control the entire spot break, a technique for handling conflicts between different ad management servers can be used to improve the listening/viewing experience for media consumers. In some embodiments, information passed directly or indirectly between the different ad management servers can be used to avoid, or minimize, the occurrence and impact of inter-server conflicts that may arise. It will be noted that row 4 does not present a potential for inter-server conflicts, because a single ad management server controls an entire spot break.

The Constraints on Inventory/Pacing Management column refers generally to limitations on presenting advertisements imposed by various split arrangements. Pacing refers generally to the speed/frequency with which an inventory of sold advertisements is carried out. For example, if 200 spots are sold for playout on weekdays during a particular month, to remain "on pace" to playout all of the advertisements during the month, 10 spots should be aired each weekday of the month (assuming a 4 week month). Some split orders can make it more difficult to remain on pace during periods of increased ad play, for example a national ad campaign that requires a large number of advertisements to be played during a limited period of time, because the available ad time is split between national and local ads. This effectively leaves less time for playout of the national ads. Consider row 4, for example. Assume that a broadcast hour includes two ad breaks, and it is desirable to broadcast a particular ad 2 times per hour to stay on pace. Further assume that business rules prohibit 2 ads from being played during the same hour. It is apparent that the desired pace cannot be maintained, because only one ad can be played each hour.

The Revenue Management, Ad Ops POV (Point of View) column illustrates how a particular type of ad break split will affect revenue management and ad opportunities. For example, if an ad break is split as illustrated by row 1, it may be more difficult to sell ad space to national buyers, since national ads will generally air at the end of an ad break. If the split is performed according to row 2, local ads may be more difficult to sell. If control of an ad break is performed as shown in row 3, local and national ads are alternated, so there will be little negative impact.

The last column, labeled NPP POV (national programming platform point of view) shows how the split arrangement can be viewed from the perspective of the NPP. Generally, although not necessarily always, both the first and second ad management servers insert fill from NPP. This fill can be short form fill, which is sometimes considered less desirable, and long form fill, which is generally considered to be more desirable. If a split type results in ad breaks that have very little room for fill, the NPP may have to provide the less desirable short form fill. However, the split arrangement shown by row 5 is likely to provide the opportunity to use more long form fill, which NPP will generally find to be desirable.

Referring next to FIG. 12, a diagram illustrating the timing of the spot break split according to the split order shown in row six of FIG. 11 will be discussed. FIG. 12 includes a NexGen® being used to implement a broadcast automation system that facilitates providing spot break splits. In particular, NexGen® digital server 1203 splits control of spot break 1205 into two portions, a first portion controlled by an internal ad management server, allows the internal ad management server to insert advertisements and/or fill into the spot break up to the split. After the split, an external ad management server is scheduled to control insertion of advertisements and fill into the spot break. As illustrated the internal ad management server can pass control of the spot break to the external ad management server early, i.e. prior to the scheduled split.

Figure 13:
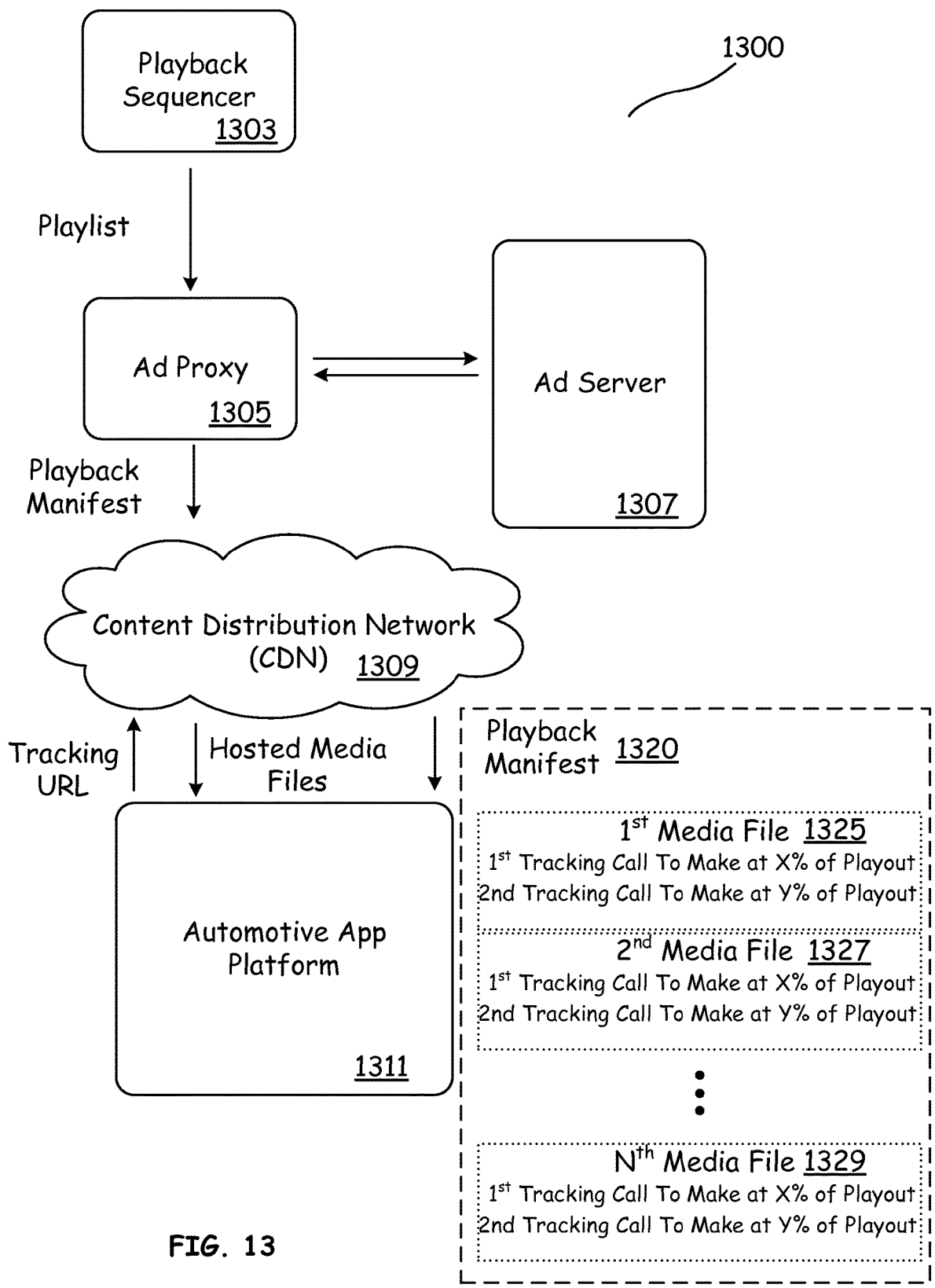
FIG. 13 is a block diagram illustrating a system for distribution and tracking of primary media files and advertising content files delivered to an automotive application platform, according to various embodiments of the present disclosure.
Figure 14:
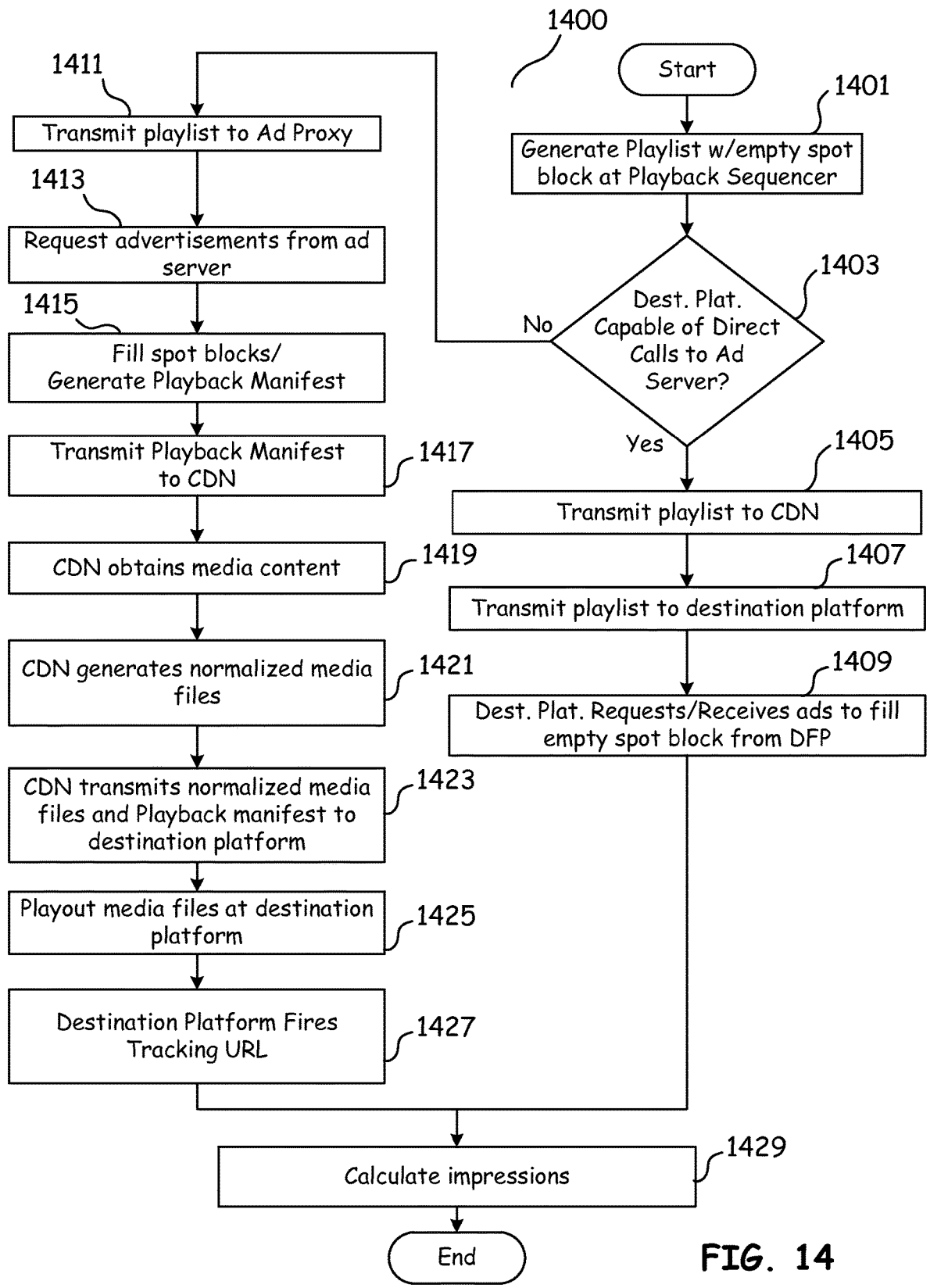
FIG. 14 is a flow diagram illustrating a method of distributing primary media files and advertising content files to an automotive application platform, and tracking playout of those files, according to various embodiments of the present disclosure.

Referring next to FIGS. 13 and 14, variations of the present disclosure tailored for use with less mature destination platforms, or platforms that do not include sufficient functionality to implement some of the above described embodiments, will be discussed. For example, in some embodiments, delivery of targeted advertising combined with reporting of impressions is implemented in an integrated automotive application platform. Some integrated automotive platforms currently lack sufficient functionality or resources to differentiate advertising spots from primary media content in a playlist, or the ability to handle requests to, and responses from, ad servers. In some cases, even if the integrated automotive application platforms could be made capable of implementing more complex ad content delivery, various design and cost considerations may weigh in favor of integrating less than full functionality into an automotive application platform.

Referring now to FIG. 13, a system 1300 for distribution and tracking of primary media files and advertising content files delivered to an automotive application platform will be discussed according to various embodiments of the present disclosure. System 1300 includes playback sequencer 1303, ad proxy 1305, ad server 1307, content distribution network 1309, and automotive application platform 1311, all of which cooperate to deliver and track media and advertisement files.

Playback sequencer 1303 can, in various embodiments, be implemented using a system including some or all of the elements of system 800, which is illustrated and discussed above with respect to FIG. 8. Various embodiments, however, can be implemented without the ability to split spot breaks. For example, one or more server computers, such as server 100, (FIG. 1), can be programmed or otherwise configured to execute a broadcast automation system that generates playlists for use in conjunction with an automotive application platform 1311. In various embodiments, playback sequencer 1303 need not be aware that the playlist being generated is to used in conjunction with a limited capability destination platform, such as an embedded automotive application platform 1311. Instead, the playlist generated can be device and platform agnostic. In other embodiments, playback sequencer 1303 can generate or alter a playlist based on the type of destination platform.

In general, a playlist generated by playback sequencer 1303 represents a schedule including both media identifiers and spot blocks. The term "schedule" refers generally to an ordered list with relative timing information specifying timing relationships between various media items and spot blocks included in the schedule. A schedule can, if desired, include actual start and end times, however it is sometimes desirable to time-shift the playlist so that playout of the media items can begin at some random time in the future, while maintaining the same relative timing relationships between playlist elements.

The playlist can include one or more spot blocks, each of which can be made up of one or more spots. In some embodiments, some or all of the spot blocks are fully or partially predetermined by an internal ad management system of the playback sequencer, such as ad management system 807, while other spot blocks are left empty. For example, a first spot block can include time slots for three advertisements, all of which can be fully or partially determined by the playback sequencer, while a second spot block can include time slots for two advertisements, neither of which have been pre-selected by playback sequencer 1303.

Where playback sequencer 1303 has selected advertisements to fill one or more portions of a spot block, playback sequencer 1303 can insert an advertisement identifier or other information into the spot block. For example, if playback sequencer 1303 selects an advertisement for Brand X soft drink for insertion into a particular spot block, playback sequencer 1303 can insert into the playlist a unique advertisement identifier, an advertisement title, a location from which to request the advertisement, such as a Uniform Resource Locator (URL), or some other suitable identifying information. In addition to, or in place of the identifier, playback sequencer 1303 can insert into the spot block the actual advertising content, metadata associated with the advertising content, or the like.

In yet other embodiments, playback sequencer 1303 can partially define the advertising content to be included in one or more spot blocks by associating a type, category, sub-category, or class of advertising content with the spot block based on various ad-placement rules. These rules can also be used to specify or prohibit placement of advertisements from particular advertisers. Some or all of the associated information can be included in the spot blocks, or in metadata associated with the spot blocks, to aid ad proxy 1305 in proper advertisement insertion, or to provide parameters for use by ad server 1307 in selecting advertisements in response to a request by ad proxy 1305.

After generating the playlist, playback sequencer 1303 can transmit the playlist via a digital, packet switched network such as the Internet, to ad proxy 1305, which in turn obtains information designating advertising content to be inserted into the empty spot blocks. In at least one embodiment, ad proxy 1305 processes the playlist received from playback sequencer 1303 to identify empty or partially empty spot blocks and requests advertising content.

Ad proxy 1305 can use information included in the playlist, for example advertising parameters included in the empty spot blocks or metadata associated with the empty spot blocks, to request advertising content from ad server 1307, which in some embodiments is a third party ad management system, similar to external ad management system 811, internal ad management system 807, or some combination of both. The information included in the advertisement request can include information such as length of a spot block, advertisement type, preferred format, advertisement priority range, a campaign identifier, prohibited advertising content, and other information that ad server 1307 can use to select appropriate advertising content for the empty spot blocks.

Ad proxy 1305 uses the information received in response to its request for advertising content and the information included in the playlist received from playback sequencer 1303 to generate a preliminary version of a playback manifest. The preliminary version of the playback manifest generated by ad proxy 1305 can, in some embodiments, also be the final version of the playback manifest, in which case the preliminary playback manifest is substantially identical to playback manifest 1320. However, in some embodiments, the preliminary playback manifest is less complete than playback manifest 1320, includes additional information not included in playback manifest 1320, or includes different information that can be used by content distribution network (CDN) 1309 to locate and provide hosted media files to automotive application platform 1311.

An example of a less-complete playback manifest is a playback manifest that does not include the tracking-calls associated with media files 1325, 1327, and 1329. Additional information included in a preliminary playback manifest can include media metadata, instructions, links, or other information used by CDN 1309 to identify and obtain hosted media files. The additional information can include, but is not limited to, destination platform information, which can used to identify automotive application platform 1311 as the proper destination platform, and normalized format information used by CDN 1309 to properly format hosted media files. In some embodiments, ad proxy 1305 generates a playback manifest that includes media identifiers or media location information that is later replaced with different location identifiers by CDN 1309.

In some embodiments, allowing CDN 1309 to replace media identifiers or other information in a playback manifest can be useful when responsibility for identifying specific servers or other hosted media locations is delegated to the CDN. For example, CDN 1309 can override a hosted media location specified in a preliminary playback manifest if CDN 1309 determines: 1) that the hosted media location is unavailable due to network connectivity issues; 2) to assist in load-balancing; or 3) to provide faster transfer times if hosted media files are available at a physical location closer to automotive application platform 1311.

In some embodiments, a hosted server location can specify a location of a device connected locally to automotive application platform 1311. For example, if some, but not all, of the media items specified in playback manifest 1320 are available from an on-board memory device either integrated into or connected to automotive application platform 1311, and CDN 1309 is aware of the location at which the media files are stored, CDN 1309 can alter the playback manifest to reflect that the media file can be obtained from the on-board storage location. The CDN can be made aware of media items available locally by using user data and preferences obtained during user registration for a service, received from a network-capable communications device connected to automotive application platform 1311, or the like.

In various embodiments, a playback manifest generated by ad proxy 1305 includes the same information included in playback manifest 1320, including addresses at which primary media content and advertising content can be obtained, and tracking-calls. In some embodiments, the advertising and the primary media content are fully or partially included in the playback manifest. Where the playback manifest generated by ad proxy 1305 includes the same information included in playback manifest 1320, CDN 1309 can simply forward playback manifest 1320 to automotive application platform 1311 without any changes.

Hosted media files can be transmitted concurrently with playback manifest 1320. The hosted media files can include both advertising content, e.g. advertisements; and primary media content, such as songs or programs. In at least one embodiment, substantially all media files delivered to automotive application platform 1311 by CDN 1309 are normalized. As used herein, the term normalized refers to transcoding or otherwise modifying the media files to ensure that the media files delivered in the same format, regardless of whether the media files contain advertising content or primary media content. One advantage to normalizing the files is that application platform 1311 need not expend processing power to identify differences between advertising content and primary media content. In some embodiments, media files can be considered to be normalized even if they are encoded according to different standards, as long as automotive application platform 1311 does not need to perform processing to determine whether or not the underlying content is primary media or advertising content.

Thus, in some embodiments, CDN 1309 can obtain primary media content and advertising content having varied formats, and deliver normalized media files to automotive application platform 1311 for playout to a media consumer as directed by playback manifest 1320.

In some embodiments, rather than providing automotive application platform 1311 with the hosted media files and playback manifest 1320 concurrently, CDN 1309 transmits the playback manifest and the hosted media files at different times. In some such embodiments, CDN 1309 can deliver playback manifest 1320, and wait until automotive application platform 1311 requests delivery of particular media files during execution of the playback manifest. For example, when executing playback manifest 1320, automotive application platform 1311 can request $1^{st}$ media file 1325 for playout. The request can include a location identifier obtained from playback manifest 1320. This location identifier can specify directly a location at which the $1^{St}$ media file can be obtained. In other implementations, the location identifier can include an indirect location identifier that allows CDN 1309 to determine a location at which the $1^{st}$ media file 1325, or content used to generate $1^{st}$ media file 1325, is stored. The content can include primary content or advertising content, and can be stored at a hosted location as a normalized media file ready for delivery to the destination platform. In some embodiments, the content is stored in a non-normalized format, and CDN 1309 performs the normalization in response to a request.

Continuing with the current example, at some point before $1^{st}$ media file 1325 is finished being played out, automotive application platform 1311 requests delivery of $2^{nd}$ media file 1327. $2^{nd}$ media file 1327 can be advertising content or primary media content, and can be delivered by CDN 1309 using the same procedure used to deliver $1^{st}$ media file 1325. Automotive application platform 1311 can request a block of one or more media files at any one time.

Playback manifest 1320 can include tracking-calls associated with some or all of the media files 1325, 1327, and 1329. These tracking-calls can be used to report playout of primary media items and advertisements, thereby facilitating calculation of a number of impressions. In some embodiments, tracking-calls fired by automotive application platform 1311 can be used for the dual purpose of initiating delivery of subsequent media files to, and tracking playout of primary media and advertising content. For example, CDN 1309 can deliver $1^{st}$ media file 1325 at the same time as playback manifest 1320, and deliver subsequent media files in response to automotive application platform firing one of the tracking-calls, e.g. a tracking URL, included in playback manifest 1320. This technique can be used to reduce the number of requests for content generated by automotive application platform 1311.

As used herein, the term "tracking-call" refers generally to a message transmitted by a destination platform, such as automotive application platform 1311, to a network location, such a server within CDN 309. As used herein, the term "tracking-call" refers to an indicator in playback manifest 1320 identifying an address or network location to which the message is sent, or an instruction included in playback manifest 1320 that causes the destination platform to "fire" or send a message. The term "tracking-call" is also used herein to refer to the content of the message being sent, or to the act of transmitting, or "firing," the message. Except where the context requires otherwise, the term "tracking-call" should be interpreted broadly to include a physical indicator or instruction included in playback manifest 1320, a message being transmitted, and the act of transmitting the message. A tracking-call can include a network address to which a message should be sent, information sent to the network address identifying a subsequent network location to be notified, or the like. Examples of tracking-calls include a uniform resource locator (URL), a tracking pixel, or some other suitable indicator, address, instruction, or message.

In various embodiments, one or more tracking-calls are associated with normalized media files 1325, 1327, and 1329, and are inserted into playback manifest 1320 by CDN 1309 or ad proxy 1305. These tracking-calls can be used to instruct and notify automotive application platform 1311 to fire, or transmit, tracking-calls at various points during playback of each media file. For example, the $1^{st}$ tracking-call associated with $1^{st}$ media file 1325 can be used to cause automotive application platform 1311 to fire a tracking-call when 30% of $1^{st}$ media file 1325 has been played out, and to fire a $2^{nd}$ tracking-call when playout of the media item has completed. The $1^{st}$ tracking-call associated with $2^{nd}$ media file 1327 can be used to cause automotive application platform 1311 to fire a tracking-call when playout of $2^{nd}$ media file 1327 is initiated, and again when playout is 75% complete.

In at least one embodiment, tracking-calls associated with a normalized media file are processed by automotive application platform 1311 the same way, regardless of whether a particular normalized media file includes advertising content or primary media content. Thus, there is no need for automotive application platform 1311 to have the capability to distinguish between advertising content and primary media content.

In some embodiments, when automotive application platform 1311 fires a tracking-call, a message is sent to a URL indicated by the tracking-call. The content of the message can include media item identifiers, allowing the CDN to determine which media item has been played out. In some implementations, the message includes a subsequent network address to be notified of the playout, and either the CDN or the device located at the subsequent address can make the determination about which media has been played out. In some instances, each different media file may correspond to a dedicated network address, allowing the media item to be determined based on the address to which the tracking-call is sent.

A first tracking-call to a particular dedicated address can be assigned a first value, and a second or subsequent tracking-call made to the same dedicated address can be assigned other values, so that when all of the tracking-calls are added together the result is 100%. Consider, for example that two tracking-calls are assigned to each media file, and each tracking-call is assigned a value of 0.5. When tracking-calls are received at a dedicated address, a counter can be incremented. The first tracking causes the counter to be incremented to represents 0.5 playouts. A second tracking-call received at the same dedicated address can cause the counter to increment another 0.5 playouts, thereby representing a full playout.

In some embodiments, tracking-calls fired by different destination platforms are not distinguished from each other, so that 4 first tracking-calls from 4 different destination platforms will have a playout value equivalent to 2 full playouts. In other embodiments, tracking-calls from different destination platforms are distinguished from each other. First and second tracking-calls can also be distinguished from each other, or have different weights assigned. For example, first tracking-calls can be assigned a weight of 0.3, and second tracking-calls can be assigned a weight of 0.7, so that two first playouts result in a total playout value of only 0.6, while a first and a second tracking-call will result in a total playout value of 1.0.

In various embodiments, CDN 1309 can process the tracking-calls, forward tracking-calls, or forward playout information included in the tracking-calls to ad proxy 1305 or ad server 1307. In some implementations, CDN 1309 includes third party servers that receive tracking URLS or other tracking-calls fired by automotive application platform 1311. The tracking-calls fired by automotive application platform 1311 can be used to determine advertising impressions by themselves, or in conjunction with information generated by ad server 1307 during the process of delivering advertising content to ad proxy 1305.

For example, an advertising impression can be registered for each 1.0 playout value determined based on the tracking-calls fired by automotive application platform 1311. In other embodiments, an impression can be registered when ad server 1307 provides an advertisement to ad proxy 1305, and at least one tracking-call has been fired by automotive application platform 1311. In some embodiments, different classes of impression can be determined, with a "class A" impression being generated when ad proxy 1305 delivered an advertisement, and full playout of the advertisement is confirmed by a tracking-call. A "class B" impression can be registered when ad proxy 1305 delivered an advertisement, and at least partial playout of the advertisement is confirmed by a tracking-call from a destination platform. Other methods of determining when and how to register impressions can be implemented using the techniques described herein.

Referring next to FIG. 14, a method 1400 of distributing primary media files and advertising content files to an automotive application platform, and tracking playout of those files, will be discussed according to various embodiments of the present disclosure. As illustrated by block 1401, a playlist having at least one partially empty spot block is generated by a playback sequencer or other media automation system. One or more entire spot blocks may be empty, or only a portion of one or more spot blocks may be empty, but at least one spot block is partially empty. The term "spot block" is used herein to refer to one or more schedule positions in a playlist at least conditionally reserved for insertion of advertising content. An empty spot block does not necessarily mean that there is no information associated with the spot block. Instead, an "empty spot block" refers to a spot block that has yet to have a specific advertisement designated for playout during the schedule position assigned to the spot block. The term "spot break" is sometimes used herein interchangeably with the term "spot block."

As illustrated by block 1403 in some embodiments, a determination is made regarding whether the destination platform is capable of making calls directly to an ad server to request advertising content, and whether the destination platform has the ability to use information provided by an ad server in response to the request. This determination can be made based on user registration information or preferences, based on a network query to the destination platform, based on information included in the playlist request, based on information about destination platform capabilities provided by an automobile manufacturer, or a combination of two or more of these methods. In some embodiments, if a request for a playlist is received from an ad proxy, or from a device other than the destination platform itself, the result of the determination at block 1403 is NO, even if the destination platform might be capable of directly requesting advertising content from an ad server. In yet other embodiments.

As illustrated by blocks 1405 and 1411, a practical result of the decision made at block 1403 is to determine whether or not the playlist will be sent to an ad proxy, or directly to a content distribution network (CDN). If the destination platform is not capable of directly requesting advertising content from an ad server, the playlist is transmitted to the CDN, as shown by block 1405. The CND transmits the playlist to the destination platform, as illustrated by block 1407, and as shown at block 1409, the destination platform requests the advertisements used to fill the empty spot blocks.

If it is determined at block 1403 that the destination platform is not capable of handling direct advertisement requests, the playlist is transmitted to an ad proxy, as shown by block 1411. As illustrated by block 1413, the ad proxy requests advertising content from an ad server. The request to the ad server can include advertising parameters and other information used in selecting advertising specifically targeted to the destination platform. In other embodiments, the ad proxy can simply provide the ad server with an identifier associated with the destination platform, and the ad server can determine the advertisement targeting parameters in addition to selecting the advertisements. Note that in some embodiments, the advertisement targeting parameters are already included in the playlist itself, or in metadata or other data associated with the playlist.

As illustrated by block 1415, the ad proxy generates a playback manifest and fills the spot blocks with the advertisements provided by the ad server. Filling the spot blocks can include, in some instances, inserting advertising content into the playlist, but in various embodiments filling empty spot blocks is performed by inserting identifiers or hosted media locations into the spot blocks. Thus a playback manifest, in at least some embodiments, includes a list of identifiers that associate particular items of primary media content and advertising content with particular time-portions of the playlist or scheduled. In some implementations, the ad proxy also inserts tracking-calls into the playback manifest.

As illustrated at block 1417, the playback manifest is transmitted to the content distribution network (CDN). As illustrated at block 1419, the CDN uses the information included in the playback manifest, to obtain primary media and advertising content for delivery to the destination platform. The CDN can obtain the content in the form of normalized media files, but as illustrated by block 1421, in one embodiment the CDN generates normalized media files from the primary media content and the advertising content.

The CDN transmits the normalized media files and the playback manifest to the destination platform, as illustrated at block 1423. The media files can be delivered to the destination platform at substantially the same time the playback manifest is delivered, or at a later time in response to media file requests or tracking-calls made by the destination platform.

As illustrated at block 1425, the destination platform plays out the normalized media files in accordance with the playback manifest, including firing tracking URLS or other tracking-calls, as shown at block 1427. The tracking URLS can be transmitted to the CDN, the ad proxy, the ad server, an advertiser's tracking system, or some other destination, for calculation of impressions, as illustrated by block 1429. Impressions can be calculated using any of various techniques without departing from the spirit and scope of the present disclosure.

Figure 15:
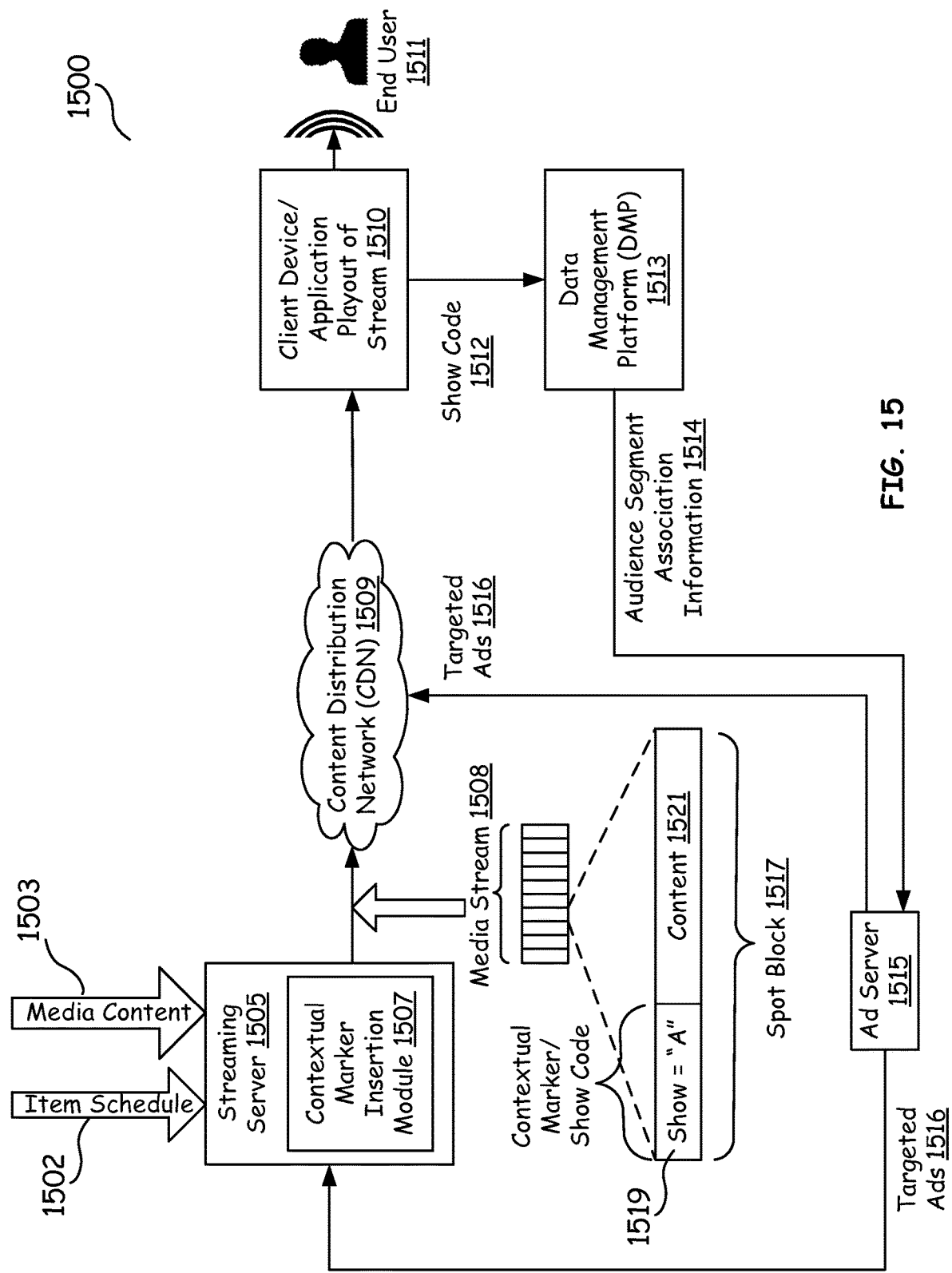
FIG. 15 is a block diagram of a passive attribution system according to various embodiments of the present disclosure.

Referring next to FIG. 15, a passive attribution system will be discussed according to various embodiments of the present disclosure. FIG. 15 includes streaming server 1505, content distribution network (CDN) 1509, client device 1510, data management platform 1513, and ad server 1515. Streaming server 1505 can be a server device configured by software, firmware, or a combination of software, hardware, and firmware to implement one or more streaming media servers. Streaming server 1505 includes contextual marker insertion module 1507, which can be used by streaming server 1505 to insert contextual markers into a media stream being delivered to end user 1511 via client device/application 1510. Although not specifically illustrated in FIG. 15, streaming server 1505 can include multiple instances of streaming media servers, where each instance of a streaming media server can be configured to stream media content to client device/application 1510. Some or all of the streams can be Internet radio stations or channels, and can be transmitted to one or more end user devices or applications. The stations or channels with which the stream is associated can be general, preconfigured stations, fully customized radio/media stations, or a hybrid preconfigured/customized station in which portions of the station are preconfigured, and others are customized by the end user. For simplicity of discussion, the present disclosure focuses primarily on a single streaming media server, but the principles and techniques disclosed herein apply equally even to one or more networked physical devices configured to implement multiple hundreds or thousands of streaming media servers.

Streaming server 1505 can receive media content 1502 and item schedule 1503 either separately or together, from any of various sources, and in any of various forms or formats. Streaming server 1505 assembles media content 1502 according to item schedule 1503 on a per station basis. For example, if two different media stations are using two different schedules, the stream for each media station may be assembled to include the media items and timing relationships specified in each of the respective different schedules.

In at least some embodiments, contextual marker insertion module 1507 inserts contextual markers into the media stream to generate media stream 1508, which is transmitted to content distribution network (CDN) 1509. The contextual markers can be inserted into spot blocks "in-band," thereby integrating the contextual markers into the spot blocks that make up media stream 1508. In at least some embodiments, contextual markers are inserted into a spot block include information that can be used to identify the media item included in or adjacent to the spot block. For example, spot block 1517 may include a contextual marker 1519 that identifies content 1521 as being "Show 'A'." In some embodiments, in addition to or in place of information identifying the media content in the spot block, contextual marker 1519 includes information identifying a genre, the type and/or genre of content in the spot block (talk, music, weather, news, rock, oldies). In some embodiments, contextual marker 1519 can also include a show or personality identifier, station identifier, a target audience segment identifier, and other information related to media or advertisement targeting.

Figure 16:
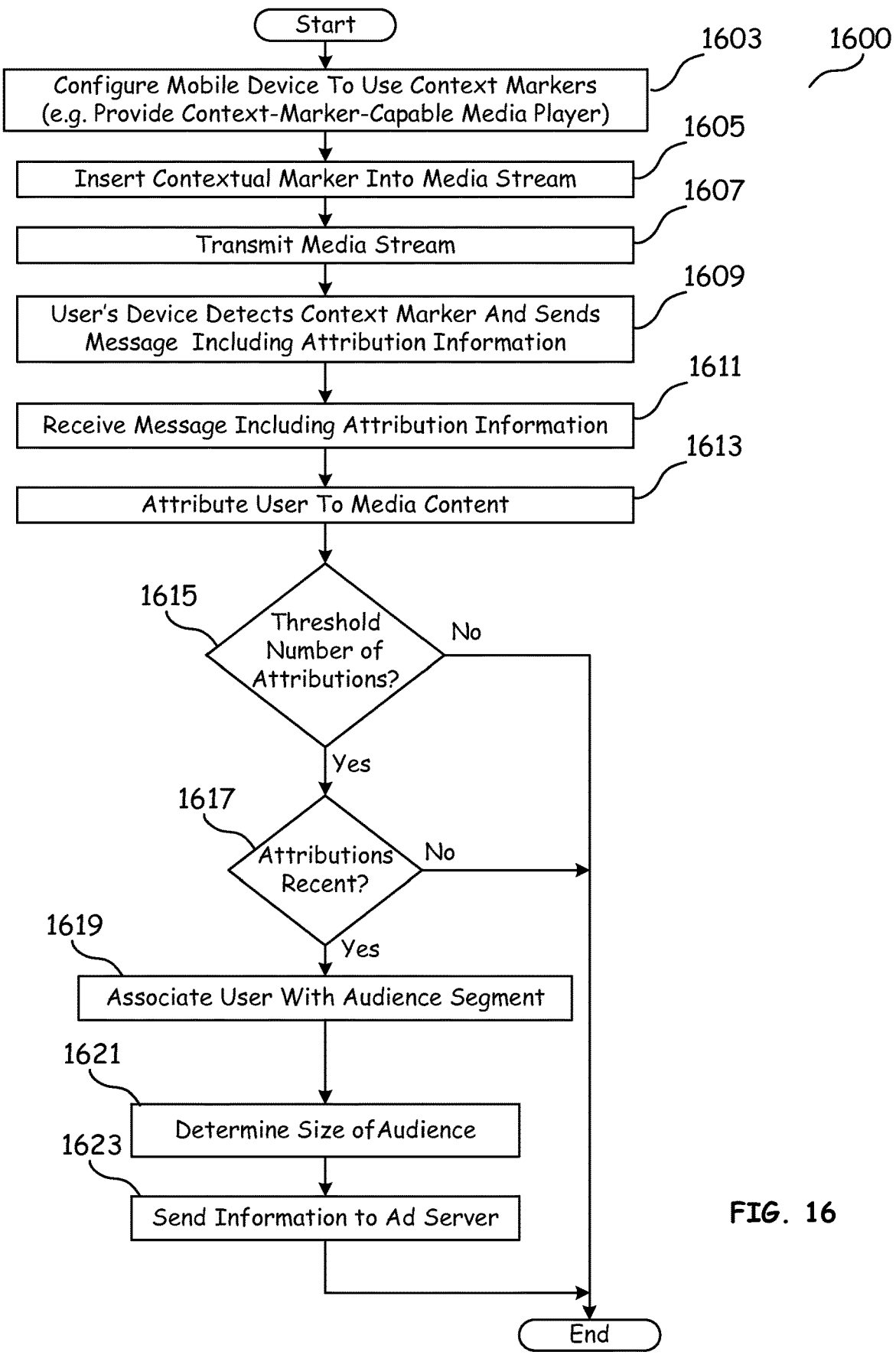
FIG. 16 is a block diagram illustrating attribution based on passive audience behavior, according to various embodiments of the present disclosure.

Although the term "spot block," is used in some contexts to refer to portions of a schedule assigned to advertising content, as used in the context of FIGS. 15 and 16, a "spot block," refers generally to a defined portion of time assigned to particular media content according to item schedule 1503, and does not refer specifically to advertising content. For example, a pre-recorded show can be assigned to one or more spot blocks; a song can be assigned to a spot block; a live news, traffic, or weather report can be assigned to a spot block; or some other audio, visual, or audio-visual media item can be assigned to a spot block.

In cases where the spot block includes advertising, contextual marker 519 can include information about media items adjacent to, i.e. preceding or following, the advertising spot block in media stream 1508. For example, if content 1521 in spot block 517 includes advertising content to be streamed during Show "A" contextual marker 1519 can include information related to the advertising content included in content 1521, information related to Show "A", or information related to both the advertising content and Show "A"

Contextual markers can also include metadata associated with content 521 such as artist, genre, runtime, media source, title, target audience identifiers, and the like. Additionally, contextual markers can include a URL, instruction, links, or other information that can be used by client device 1510 to report playout of content 521 to data management platform (DMP) 1513.

In some embodiments media stream 1508 can include empty spot blocks, which are reserved for CDN 1509 to insert targeted advertisements 1516 obtained from ad server 1515. In other embodiments, advertisement server 1515 can provide targeted advertisements 1516 to streaming server 1505, which inserts the targeted advertisements in spot blocks slotted for insertion of advertisements based on item schedule 1503.

Advertisement server 1515 can operate in an iterative fashion, first providing either non-targeted, or broadly-targeted, advertisements for insertion into media stream 1508 before audience segment association information 1514 is available. Later, after audience segment association information 1514 becomes available from DMP 1513, advertisement server 1515 can provide more specifically targeted advertisements by taking into account the audience segment association information 1514.

Audience segment association information 1514 can be determined based on passive behaviors of end user 1511, which can be inferred from show code 1512 included in messages transmitted by client device/application 1510 in response to encountering contextual markers 1519 in a media stream. For example, CDN 1509 delivers media stream 1508 to client device/application 1510 for playout to end user 1511. The client device/application 1510, upon recognizing the presence of contextual marker 1519, transmits a message including show code 1512 to DMP 1513. DMP 1513 can use the show code to attribute end user 1511 to a media content item corresponding to show code 1512. After a threshold number of attributions of end user 1511 to particular media content, DMP 1513 can associate user 1511 with an audience segment.

DMP 1513 can provide information relating to the association with the audience segment, and/or attribution of end user 1511 to a show, to advertisement server 1515, which in turn uses the audience segment association information to refine advertisement targeting. In various embodiments DMP 1513 also takes into account the recency of the attributions in deciding whether or not to associate end user 1511 with an Audience segment. In some embodiments, a recency threshold can be used to set a limit on the age of attributions considered for audience segment association, so that no attributions older than the recency threshold are considered in determining the threshold number of attributions. In various embodiments, a weighting system can be used, so that more recent attributions are given more weight. Threshold and weighting systems can also be combined, so that for example, attributions older than a first recency threshold are assigned decreasing weights until a second recency threshold is reached, beyond which attributions are not considered.

Referring next to FIG. 16, a method 1600 of attributing users to audience segments based on passive behavior will be discussed according to various embodiments of the present disclosure.

As illustrated by block 1603, method 1600 can begin by configuring a mobile device to use context markers, for example show codes. It will be appreciated that block 1603 need not be performed in various embodiments, for example when a streaming media player has already been configured to use context markers. In at least one embodiment, configuring a mobile device to use context markers can include providing a media player application or browser plug-in capable of processing context markers to the mobile device to be configured. The specific configuration of the media player is, in some embodiments, dependent upon the format of the context markers. For example, in embodiments where the context markers are inserted into spot blocks as in-band Uniform Resource Locators (URLs), the media player can be constructed or configured to read the URLs and transmit a tracking call to the address identified by the URL in a fixed format programmed into the media player. In some embodiments, the context markers can also include both address and format information, so that the media player can determine both where the tracking call is to be sent, and which protocol to use in generating and transmitting the tracking call. In other embodiments, the media player can be configured at installation to send all messages to a particular address, so that no URL or other address needs to be included in the context marker.

In some embodiments, the context markers can include show codes, while in other embodiments the context markers do not explicitly include show codes, and the media player can be used to generate the show code based on other information available to the media player. In at least one embodiment, to minimize the processing time required by the media player, the media player can be programmed to strip out the show code and transmit the show code to a predetermined address, without actually being required to analyze the show code portion of the context markers. This technique can also allow the show codes to be encrypted, thereby helping to prevent unauthorized access to the show code. In other embodiments, the media player can be programmed to retrieve and transmit, as the show code, a content identifier from the metadata of a media item.

As used herein, the term "show code" can refer to an identifier from which the identity of particular show can be determined. In some embodiments, a "show code" can also refer to information identifying a show type, an intended audience of the show, a show category, or other information that can be used to attribute a user to particular media item, category of media items, or audience segment. The following items are examples of show codes: a media title ("the Simpsons®", a media genre (comedies), a media author ("Rolling Stones"), a target audience segment (males age 25-35), a media type (news, talk radio), or the topic of conversation within a talk show. For example, a show code can be assigned to one or more show segments (spot blocks), during which a nationally recognized talk show host is discussing a current political crisis. The frequency and recency of a user listening to topics could be valuable to marketers who use ad serving technology to target advertisements to appropriate audience segments.

A show code need not provide the ability to determine a particular instance of a media item, but can be used for that purpose in some embodiments. For example, a show code may be sufficient to identify that an instance of season 2, episode 4 of a particular show has been listened to, but insufficient to determine that the episode has been shortened or otherwise edited. Consider, for example, that an uncut and a sanitized version of a song can have the same title. In cases where the title of the media item is used as the show code, there might be no distinction between the two versions. However, in cases where a unique identifier is included in the show code, the uncut and the sanitized version can be distinguished from each other.

As illustrated at block 1605, a contextual marker can be inserted into a media stream. In at least one embodiment, the contextual marker is inserted by a streaming server prior to transmitting the stream, as illustrated by block 1607.

As shown by block 1609, the context marker can be detected by a user's device receiving the stream. Upon detection of the context marker, the user's device can send a message including attribution information, e.g. a show code, to a data management platform. As illustrated by block 1611, the message including the attribution information can be received at a data management platform for processing.

As illustrated at block 1613, the attribution information is used to associate a user with media content. In at least one embodiment, the attribution information also includes information sufficient to identify the mobile device, the user, and/or the particular media player, from which the message is transmitted. The mobile device and/or the media player can be associated with a user based on information obtained during registration of the media player, and/or during registration with a streaming media service. Likewise, the user can be identified based on the same information. Note that identification of the user does not necessarily require knowing the name of the user, but the user can instead be "anonymously identified" e.g. as "user 12345".

Based on the show code or other attribution information, along with the ability to associate the attribution information with a user, even if anonymously identified, the user can be attributed to the show associated with the show code, and a counter can be incremented for each such attribution. For example, if the show code identifies the song, "Superman," and the user is identified as user 12345, then user 12345 can be attributed to the song "Superman." In at least one embodiment, a counter is incremented for each attribution of user 12345 with the song "Superman." Similarly, if the attribution information indicated a target audience, e.g. "male age 25-35," user 12345 could be associated with "male age 25-35," and an attribution counter indicating a number of times user 12345 has been attributed, or associated with the "male age 25-35" can be incremented.

As illustrated at block 1615, a check is made to determine whether a threshold number of attributions has been met or exceeded. In various embodiments, a check can also be made to determine whether the number of attributions for multiple different attribution types or categories has been exceeded. For example, if attributions for a particular user are tracked for six different attribution types or categories, e.g. attributions to two different shows, one genre, and three different demographic groups, block 1615 might indicate that a threshold number of attributions has been reached for one of the two shows and for two of the three demographic groups, but not for the other attributions being tracked. In at least one embodiment, a threshold number of attributions can vary depending on the attribution type, while other embodiments employ a universal threshold. For example, the threshold number of attributions can be set to 20 for any demographic attribution, the threshold number of attributions for a first show can be set to 10, the threshold number of attributions for a second show can be set to 12, and so on.

If the check at block 1615 indicates that the threshold number of attributions has not been reached, method 1600 can end. Otherwise, as illustrated at block 1617, the recency of attributions can be taken into account to determine if the attributions are sufficiently recent. Thus, for example, a recency threshold can be set so that only attributions less than one month old, one week old, etc., are considered in determining whether the threshold number of attributions has been satisfied. In some cases, recency can be used to weight attributions. In a simple linear example, the "value" of an attribution can be decreased by 0.1 per day, so that an attribution made today counts as a full attribution, a one day old attribution counts as 0.9 attributions, a two day old attribution is counted as 0.8 attributions, and so on.

In other embodiments, recency can be taken into account by giving more weight to recent attributions that match older attributions. For example, if an attribution within the last hour matches an attribution from 1 week ago, which matches an attribution from 1 week previously, the group of attributions over time can be given more weight than any single attribution might otherwise be given.

In embodiments that employ a recency determination, if the determination shown at block 1617 indicates that the attribute is not recent, method 1600 can end. If the attributions are sufficiently recent, for example if they satisfy a recency threshold, the user being attributed can be associated with an audience segment. In at least one embodiment, one or more attribution thresholds are used to associate a user with an audience segment. For the case where a single attribution threshold is used, consider the case of a user listening almost every day to a particular "shock jock." In that case, the user would have a large number of attributions to that "shock jock," and could be associated with an audience segment of "shock jock" power fans. For the case where multiple attribution thresholds are used to associate a user with an audience reaching at least a certain number of attribution thresholds could be required before assigning the user to a particular audience segment. For example, a user might need to meet the threshold number of attributions for five different soft-rock songs before being associated with a soft-rock audience segment. In some embodiments, a user can be associated with multiple different audience segments based on satisfying a single attribution threshold, or multiple attribution thresholds As illustrated at block 1621, in at least some embodiments the size of an audience segment can be determined based on the number of users associated with the audience segment, wherein the number of users associated with the audience segment is determined, at least in part, based on passive listening as determined by user attributions. The number of users associated with the audience can, in some embodiments, also take into account user activities, such as following, liking, tweeting, tuning away, and the like.

As illustrated at block 1623, information related to user associations with audience segments and user attributions, as well as audience size information, can be provided to an ad server. The ad server can use the provided information to select targeted advertisements on a per-show basis, per-user basis, per-segment basis, or otherwise.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g. cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

The present disclosure has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present disclosure may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method of generating a media stream, the method comprising:
    iteratively adjusting media content included in a media stream based on evaluation of messages provided to a data management platform by a client device over time, wherein iteratively adjusting includes:
        receiving over time, at a data management platform, messages including indications that a user associated with a user client device has played out particular media items included in a media stream, the messages generated by the user client device in response to encountering contextual markers integrated within spot blocks adjacent to the particular media items in the media stream, the contextual markers including information related to advertisement content included in the spot blocks and to the particular media items;
        in response to receipt of the messages, recording, in a memory, an association between the user and the particular media items;
        identifying, by the data management platform, at least one audience segment associated with the particular media items;
        generating segment association information, the segment association information associating the user with the at least one audience segment, based, at least in part, on the association between the user and the particular media items and the association between the particular media items and the at least one audience segment;
        transmitting the segment association information from the data management platform to an advertisement server, the advertisement server configured to iteratively refine a targeting specificity of advertisement content provided to a streaming server by the advertising server; and
        generating, at the streaming server a media stream including spot blocks, the spot blocks including the advertisement content provided by the advertising server and the contextual markers.

2. The method of claim 1, further comprising:
    incrementing an instance counter describing a number of instances the user has been associated with the particular media item by a value of one; and
    associating the user with the audience segment if the instance counter meets a preset threshold value.

3. The method of claim 2, further comprising:
    determining a recency associated with at least some of the instances the user has been associated with the particular media item; and
    associating the user with the audience segment if the instance counter meets the preset threshold value, and the recency of the at least some of the instances the user has been associated with the particular media item meets a preset threshold time indicator.

4. The method of claim 1, further comprising:
    determining a size of an audience of the particular media item based on both passive and active behavioral events, wherein the passive behavioral events are determined using attribution based on contextual markers included in media streams, and active behavioral events are determined based on user activities.

5. The method of claim 1, further comprising:
    inserting the contextual markers into the media stream at a streaming media server.

6. The method of claim 1, further comprising:
    configuring a mobile device to generate calls to the data management platform in response to the mobile device detecting the contextual markers.

7. The method of claim 1, further comprising:
    associating the user with at least one audience segment based on data derived from a station start, data derived during passive station playback, data derived from web page views, and data derived from user interactions.

8. A system comprising:
    a server device configured to implement a streaming media server, the streaming media server configured to:
        integrate contextual markers into spot blocks of a media stream, the spot blocks positioned adjacent to particular media items included in the media stream;
        transmit the media stream, including the contextual markers, to a content distribution network for delivery to a user client device associated with a user, wherein the contextual marker identifies the particular media items adjacent to the spot blocks into which the contextual markers are integrated; and
    a data management platform configured to:
        receive from the user client device, messages including indications that the user client device has played out particular media items identified by the contextual markers;
        in response to receipt of the messages, record in a memory, an association between the user and the particular media items;
        identify at least one audience segment associated with the particular media items;
        generate segment association information, the segment association information associating the user with the at least one audience segment, based, at least in part, on the association between the user and the particular media items and the association between the particular media items and the at least one audience segment;
        transmit the segment association information to an advertisement server, the advertisement server configured to iteratively refine a targeting specificity of advertisement content provided to the streaming media server by the advertising server; and
    the streaming media server further configured to generate a media stream including spot blocks, the spot blocks including the advertisement content provided by the advertising server and the contextual markers.

9. The system of claim 8, wherein the data management platform is further configured to:
increment an instance counter describing a number of instances the user has been associated with the particular media item by a value of one; and
associate the user with the audience segment if the instance counter meets a preset threshold value.

10. The system of claim 9, wherein the data management platform is further configured to:
determine a recency associated with at least some of the instances the user has been associated with the particular media item; and
associate the user with the audience segment if the instance counter meets the preset threshold value, and the recency of the at least some of the instances the user has been associated with the particular media item meets a preset threshold time indicator.

11. The system of claim 8, wherein the data management platform is further configured to:
determine a size of an audience of the particular media item based on both passive and active behavioral events, wherein the passive behavioral events are determined using attribution based on contextual markers included in media streams, and active behavioral events are determined based on user activities.

12. The system of claim 8, wherein the streaming media server is further configured to:
insert the contextual markers into the media stream.

13. The system of claim 8, further comprising a client device configured to:
generate the indications in response to detecting the contextual markers.

14. The system of claim 8, wherein the data management platform is further configured to:
transmit information indicating an association between the user and the audience segment to an ad server.

15. A data management platform comprising:
a network interface configured to receive, over time, from a user client device of a user, messages including indications that the user client device has played out particular media items included in a media stream, the messages generated by the user client device in response to encountering contextual markers integrated within spot blocks adjacent to the particular media items in the media stream, the contextual markers including information related to advertisement content included in the spot blocks and to the particular media items;
a processor and associated memory coupled to the network interface, the processor and associated memory configured, in response to receipt of the messages, to:
record in a memory an association between the user and the particular media items;
identify at least one audience segment associated with the particular media items;
increment an instance counter describing a number of instances the user has been associated with the particular media item by a value of one; and
generate segment association information, the segment association information associating the user with the at least one audience segment based, at least in part, on the association between the user and the particular media item and the association between the particular media item and the at least one audience segment; and
transmitting the segment association information from the data management platform to an advertisement server, the advertisement server configured to iteratively refine a targeting specificity of advertisement content provided to a streaming server by the advertising server based on the segment association information.

16. The data management platform of claim 15, wherein the processor and associated memory are further configured to:
associate the user with the audience segment if the instance counter meets a preset threshold value.

17. The data management platform of claim 15, wherein the processor and associated memory are further configured to:
determine a recency associated with at least some of the instances the user has been associated with the particular media item; and
associate the user with the audience segment if the instance counter meets a preset threshold value, and the recency of the at least some of the instances the user has been associated with the particular media item meets a preset threshold time indicator.

18. The data management platform of claim 15, wherein the processor and associated memory are further configured to:
determine a size of an audience of the particular media item based on both passive and active behavioral events, wherein the passive behavioral events are determined using attribution based on contextual markers included in media streams, and active behavioral events are determined based on user activities.

19. The data management platform of claim 15, wherein the indications include notifications generated by and received from a mobile device in response to the mobile device detecting the contextual markers.

20. The data management platform of claim 15, wherein the processor and associated memory are further configured to:
associate the user with at least one audience segment based on data derived from a station start, data derived during passive station playback, data derived from web page views, and data derived from user interactions.

* * * * *